United States Patent
Iizuka et al.

(10) Patent No.: US 9,667,979 B2
(45) Date of Patent: May 30, 2017

(54) IMAGE COMPRESSION CIRCUIT, IMAGE COMPRESSION METHOD, AND TRANSMISSION SYSTEM

(71) Applicant: Sony Corporation, Tokyo (JP)

(72) Inventors: Hiroshi Iizuka, Kanagawa (JP); Hidekazu Kikuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 316 days.

(21) Appl. No.: 14/289,204

(22) Filed: May 28, 2014

(65) Prior Publication Data

US 2014/0369406 A1 Dec. 18, 2014

(30) Foreign Application Priority Data

Jun. 17, 2013 (JP) .................................. 2013-126627

(51) Int. Cl.
- *H04N 19/124* (2014.01)
- *H04N 19/169* (2014.01)
- *H04N 19/136* (2014.01)

(52) U.S. Cl.
CPC ....... *H04N 19/1883* (2014.11); *H04N 19/124* (2014.11); *H04N 19/136* (2014.11)

(58) Field of Classification Search
CPC . H04N 19/1883; H04N 19/124; H04N 19/136
See application file for complete search history.

(56) References Cited

U.S. PATENT DOCUMENTS

| | | | | |
|---|---|---|---|---|
| 4,920,414 A * | 4/1990 | Remus | ................. | H04N 19/176 375/240.06 |
| 2002/0005847 A1 * | 1/2002 | Hiroi | ....................... | G06T 17/20 345/419 |
| 2002/0018565 A1 * | 2/2002 | Luttrell | ................ | H04N 7/1675 380/217 |
| 2002/0114392 A1 * | 8/2002 | Sekiguchi | ................ | H04N 7/24 375/240.15 |
| 2004/0184534 A1 * | 9/2004 | Wang | ................... | H04N 19/147 375/240.03 |
| 2005/0002583 A1 * | 1/2005 | Kondo | ................. | H04N 19/593 382/239 |
| 2005/0056768 A1 * | 3/2005 | Oldham | ............. | G01N 21/6458 250/208.1 |
| 2006/0257037 A1 * | 11/2006 | Samadani | ............ | H04N 19/176 382/251 |
| 2007/0019879 A1 * | 1/2007 | Han | ........................ | H04N 19/61 382/251 |
| 2007/0229325 A1 * | 10/2007 | Yokose | ................ | H04N 19/149 341/51 |

(Continued)

FOREIGN PATENT DOCUMENTS

JP 2012-044252 3/2012

*Primary Examiner* — Jay Patel
*Assistant Examiner* — Joseph Suh
(74) *Attorney, Agent, or Firm* — Michael Best & Friedrich LLP

(57) ABSTRACT

An image compression circuit includes: a transform section configured to transform a plurality of pieces of pixel data into a plurality of pieces of coefficient data; and a quantization section configured to obtain a quantization parameter based on a predetermined number of pieces of the coefficient data, and to quantize the predetermined number of pieces of the coefficient data with use of the quantization parameter.

19 Claims, 28 Drawing Sheets

(56) References Cited

U.S. PATENT DOCUMENTS

| | | | | |
|---|---|---|---|---|
| 2008/0253448 A1* | 10/2008 | Lin | ........................ | H04N 19/15 |
| | | | | 375/240.03 |
| 2008/0253450 A1* | 10/2008 | Lin | ........................ | H04N 19/15 |
| | | | | 375/240.04 |
| 2008/0265166 A1* | 10/2008 | Shekhar | ................ | G01T 1/1611 |
| | | | | 250/363.03 |
| 2008/0298469 A1* | 12/2008 | Liu | ........................ | H04N 19/15 |
| | | | | 375/240.26 |
| 2009/0257506 A1* | 10/2009 | Auyeung | ............. | H04N 19/176 |
| | | | | 375/240.24 |
| 2010/0074337 A1* | 3/2010 | Gao | ..................... | H04N 19/176 |
| | | | | 375/240.16 |
| 2011/0002381 A1* | 1/2011 | Yang | ................... | H04N 19/172 |
| | | | | 375/240.03 |
| 2012/0166503 A1* | 6/2012 | Portell I De Mora | ...................... H03M 7/4056 |
| | | | | 708/203 |
| 2014/0037209 A1* | 2/2014 | Robinson | ............. | G06K 9/6232 |
| | | | | 382/170 |
| 2014/0321551 A1* | 10/2014 | Ye | ....................... | H04N 19/197 |
| | | | | 375/240.16 |
| 2015/0078442 A1* | 3/2015 | Lim | ........................ | H04N 19/70 |
| | | | | 375/240.03 |

\* cited by examiner

| COEFFICIENT DATA C | 10 | 9 | 7 | 8 | 7 | 8 | 2 | 6 |
|---|---|---|---|---|---|---|---|---|
| COEFFICIENT DIV | 1 | | | | 2 | | | |
| COEFFICIENT DATA A1 | 10 | 9 | 7 | 8 | 3 | 4 | 1 | 3 |
FIG. 16
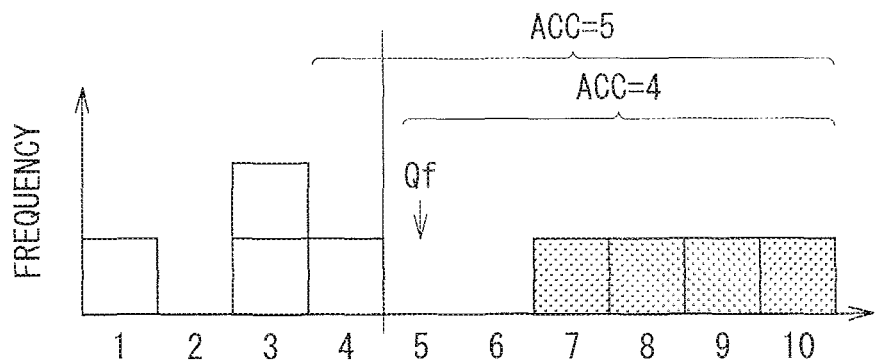
FIG. 17
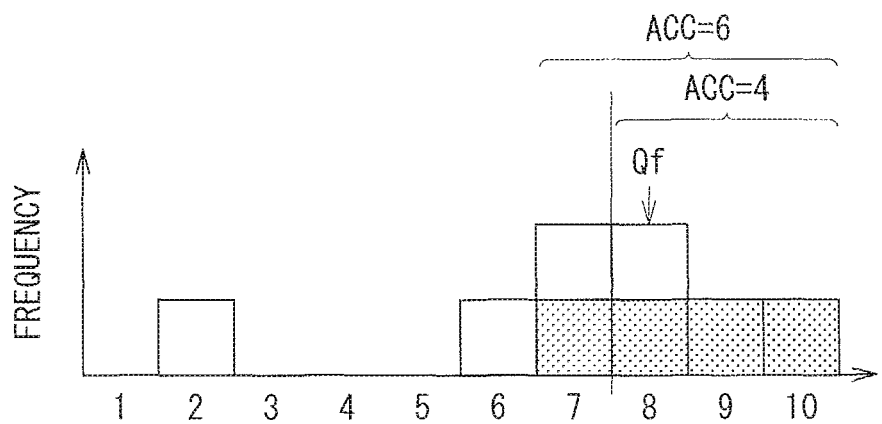
FIG. 18

| COEFFICIENT DATA A1 ||| COEFFICIENT DATA A11 |
|---|---|---|---|
| Min. | Max. | WIDTH | |
| 0 | 0 | 1 | 0 |
| 1 | 1 | | 1 |
| 2 | 2 | | 2 |
| 3 | 3 | | 3 |
| ⋮ | ⋮ | | ⋮ |
| 29 | 29 | | 29 |
| 30 | 30 | | 30 |
| 31 | 31 | | 31 |
| 32 | 33 | 2 | 32 |
| 34 | 35 | | 33 |
| ⋮ | ⋮ | | ⋮ |
| 60 | 61 | | 46 |
| 62 | 63 | | 47 |
| 64 | 67 | 4 | 48 |
| 68 | 71 | | 49 |
| ⋮ | ⋮ | | ⋮ |
| 88 | 91 | | 54 |
| 92 | 95 | | 55 |
| 96 | 103 | 8 | 56 |
| 104 | 111 | | 57 |
| 112 | 119 | | 58 |
| 120 | 127 | | 59 |
| 128 | 143 | 16 | 60 |
| 144 | 159 | | 61 |
| 160 | 191 | 32 | 62 |
| 192 | 256 | 65 | 63 |

FIG. 24

| COEFFICIENT DATA A1 | CODE CC[63:0] |
|---|---|
| 0 | 0000⋯000001 |
| 1 | 0000⋯000011 |
| 2 | 0000⋯000111 |
| 3 | 0000⋯001111 |
| ⋮ | ⋮ |
| 61 | 0011⋯111111 |
| 62 | 0111⋯111111 |
| 63 | 1111⋯111111 |

FIG. 27

IMAGE COMPRESSION CIRCUIT, IMAGE COMPRESSION METHOD, AND TRANSMISSION SYSTEM

CROSS REFERENCE TO RELATED APPLICATIONS

This application claims the benefit of Japanese Priority Patent Application JP 2013-126627 filed Jun. 17, 2013, the entire contents of which are incorporated herein by reference.

BACKGROUND

The present disclosure relates to an image compression circuit, an image compression method used in the image compression circuit, and a transmission system using the image compression circuit.

In transmission of a moving picture between apparatuses, images configuring the moving picture are compressed and transmitted. Specifically, in a transmission system, a transmission capacity (so-called transmission band) transmittable per an image unit time is limited, and thus the images are compressed so as to be within the transmission capacity. In performing the image compression, code size is allowed to be decreased as compression is more performed; however image quality is degraded. Therefore, so-called rate control of adjusting compression degree is frequently performed in order to suppress degradation of the image quality and to allow the code size to be within the transmission capacity.

Various technologies are disclosed about the rate control. For example, in Japanese Unexamined Patent Application Publication No. 2012-44252, a transmission system in which the rate control is performed based on compressed coded data is disclosed.

SUMMARY

Incidentally, at the time of transmitting the moving picture, for example, in use in which real time property is important, transmission delay may be desirably as small as possible. Moreover, at the time of transmitting the moving picture, a buffer memory is often used, and a memory capacity of the buffer memory may be desirably small.

It is desirable to provide an image compression circuit, an image compression method, and a transmission system that are capable of reducing transmission delay as well as reducing a memory capacity of a buffer memory.

According to an embodiment of the technology, there is provided an image compression circuit including: a transform section configured to transform a plurality of pieces of pixel data into a plurality of pieces of coefficient data; and a quantization section configured to obtain a quantization parameter based on a predetermined number of pieces of the coefficient data, and to quantize the predetermined number of pieces of the coefficient data with use of the quantization parameter.

According to an embodiment of the technology, there is provided an image compression method including: transforming a plurality of pieces of pixel data into a plurality of pieces of coefficient data; and obtaining a quantization parameter based on a predetermined number of pieces of the coefficient data, and quantizing the predetermined number of pieces of the coefficient data with use of the quantization parameter.

According to an embodiment of the technology, there is provided a transmission system provided with a transmitter and a receiver. The transmitter includes: a transform section configured to transform a plurality of pieces of pixel data into a plurality of pieces of coefficient data; and a quantization section configured to obtain a quantization parameter based on a predetermined number of pieces of the coefficient data, and to quantize the predetermined number of pieces of the coefficient data with use of the quantization parameter.

In the image compression circuit, the image compression method, and the transmission system according to the respective embodiments of the disclosure, the plurality of pieces of pixel data are converted into the plurality of pieces of coefficient data, and the plurality of pieces of coefficient data are quantized by the quantization parameter. At that time, predetermined number of pieces of coefficient data are quantized by the quantization parameter that is obtained based on the predetermined number of pieces of coefficient data.

In the image compression circuit, the image compression method, and the transmission system according to the respective embodiments of the disclosure, the quantization parameter is obtained based on the predetermined number of pieces of coefficient data, and the predetermined number of pieces of coefficient data are quantized with use of the quantization parameter. Therefore, it is possible to reduce transmission delay as well as to reduce a memory capacity of a buffer memory.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 16 is a table for explaining an operation example of a divisor table and a division circuit illustrated in FIG. 4.

FIG. 17 is an explanatory diagram for explaining the operation example of the divisor table and the division circuit illustrated in FIG. 4.

FIG. 18 is another explanatory diagram for explaining the operation example of the divisor table and the division circuit illustrated in FIG. 4.

FIG. 24 is a table illustrating a characteristic example of a coefficient conversion circuit illustrated in FIG. 23.

FIG. 27 is a table illustrating a characteristic example of a code generation circuit illustrated in FIG. 26.

DETAILED DESCRIPTION

Hereinafter, preferred embodiments of the technology will be described in detail with reference to drawings. Note that description will be given in the following order.
1. First Embodiment
2. Second Embodiment
3. Application Examples
<1. First Embodiment>
(Configuration Example)
(General Configuration Example)

Figure 1:
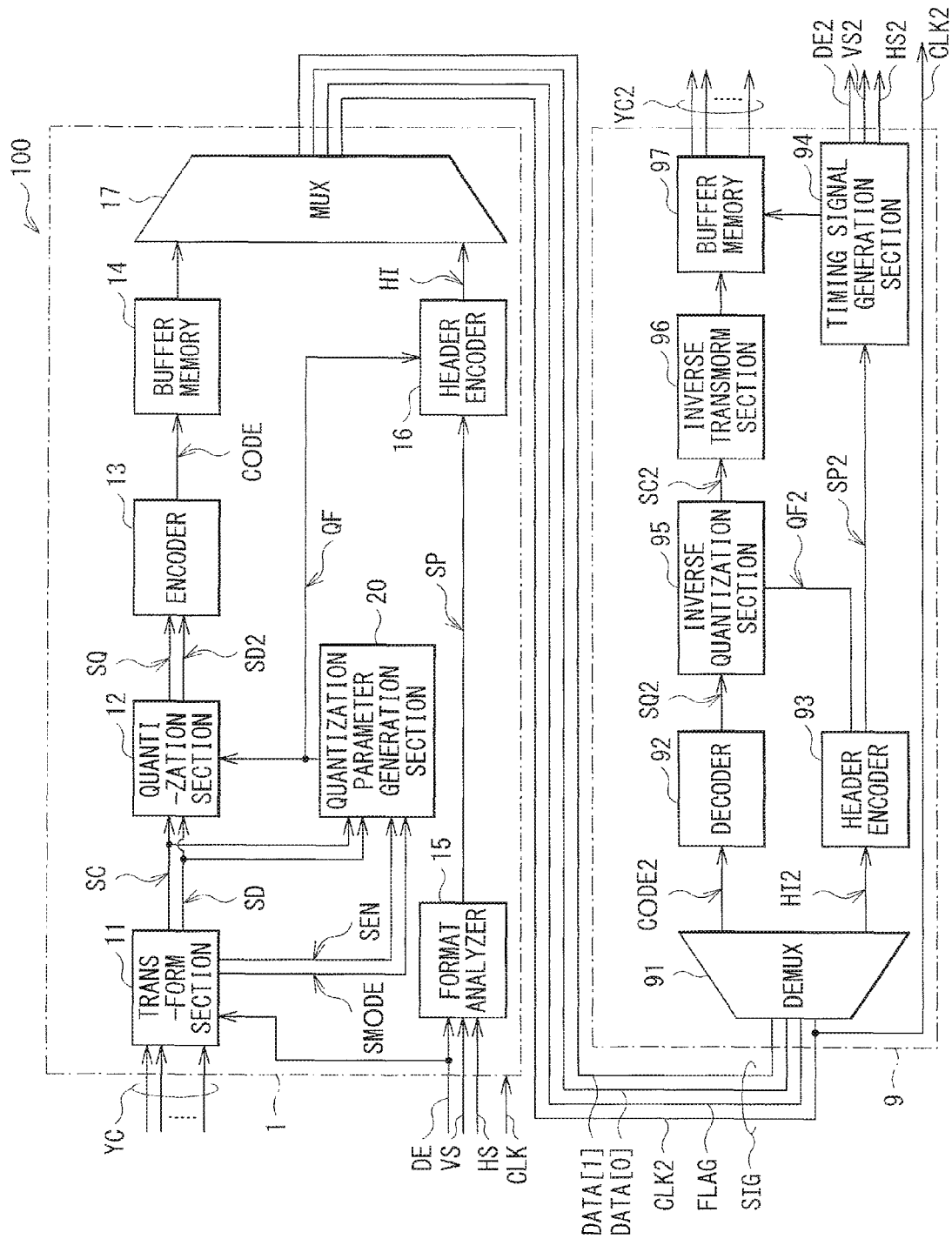
FIG. 1 is a block diagram illustrating a configuration example of a transmission system according to a first embodiment of the disclosure.

FIG. 1 illustrates a configuration example of a transmission system according to a first embodiment. A transmission system 100 is a transmission system compressing and transmitting image data. Note that an image compression circuit and an image compression method according to embodiments of the disclosure are embodied by the present embodiment, and therefore will be described together.

The transmission system 100 includes a transmitter 1 and a receiver 9. The transmitter 1 transmits image data, and the receiver 9 receives the image data transmitted by the transmitter 1. The transmitter 1 generates a transmission signal SIG based on a pixel signal YC, a data enable signal DE, a vertical synchronization signal VS, a horizontal synchronization signal HS, and a clock signal CLK. The pixel signal YC is a parallel signal including a luminance (Y) signal and color difference (Cb and Cr) signals. Further, the clock signal CLK is a reference clock, and although not illustrated, is used in various circuit blocks in the transmitter 1. The receiver 9 generates a pixel signal YC2, a data enable signal DE2, a vertical synchronization signal VS2, a horizontal synchronization signal HS2, and a clock signal CLK2 based on the transmission signal SIG transmitted from the transmitter 1. In other words, the receiver 9 generates (reproduces) signals corresponding to the respective signals input to the transmitter 1.

(Transmitter 1)

The transmitter 1 includes a transform section 11, a quantization parameter generation section 20, a quantization section 12, an encoder 13, a buffer memory 14, a format analyzer 15, a header encoder 16, and a multiplexer (MUX) 17.

The transform section 11 performs discrete wavelet transform (DWT) on each frame image F based on the pixel signal YC and the data enable signal DE, to generate a coefficient data set DS that includes the same number of coefficient data C as the number of pixel data included in each frame image F (for example, when the resolution is VGA and the format is 4:2:2, 640×480×2).

Figure 2A:
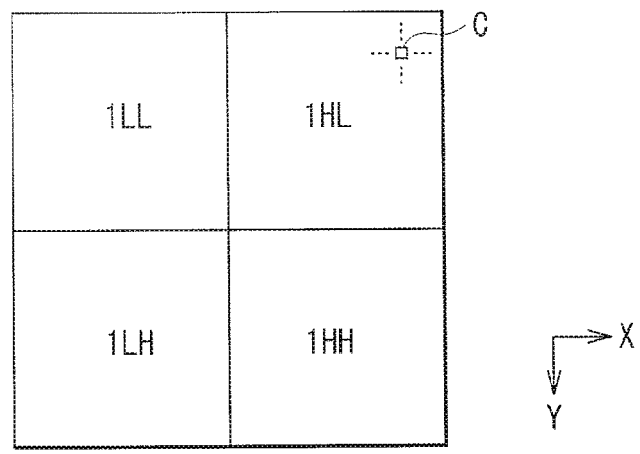
FIG. 2A is a schematic diagram illustrating an operation example of a transform section illustrated in FIG. 1.
Figure 2B:
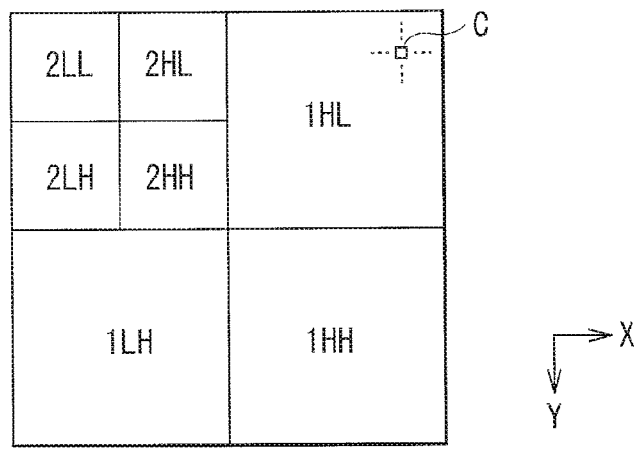
FIG. 2B is a schematic diagram illustrating another operation example of the transform section illustrated in FIG. 1.
Figure 2C:
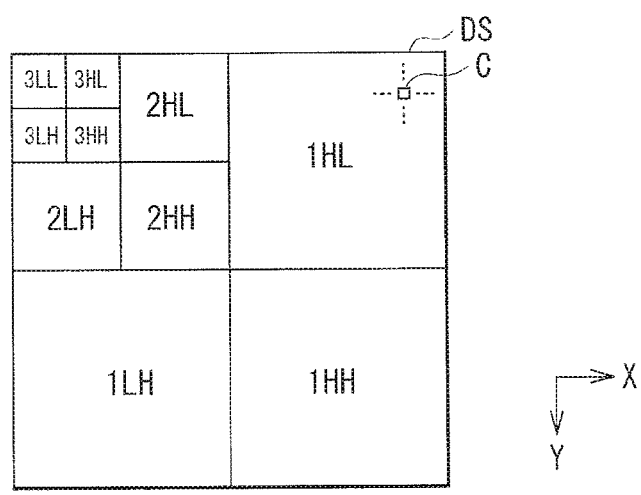
FIG. 2C is a schematic diagram illustrating still another operation example of the transform section illustrated in FIG. 1.

FIGS. 2A to 2C schematically illustrate transform processing of the discrete wavelet transform. In the transform processing, first, the transform section 11 obtains a component low in spatial frequency of pixel data configuring the frame image F (a low-frequency component) and a component high in spatial frequency (a high-frequency component) in each of a horizontal direction and a vertical direction of the frame image F, to obtain four components (sub-bands). Specifically, the transform section 11 obtains a component whose spatial frequency is low in both the horizontal direction and the vertical direction ("1LL" component), a component whose spatial frequency is high in the horizontal direction and low in the vertical direction ("1L" component), a component whose spatial frequency is low in the horizontal direction and high in the vertical direction ("1LH"), and a component whose spatial frequency is high in both the horizontal direction and the vertical direction ("1HH" component). Each of the "1LL" component, the "1HL" component, the "1LH" component, and the "1HH" component includes the number of pieces of coefficient data C equivalent to one fourth of the number of pieces of pixel data included in the frame image F. Further, as illustrated in FIG. 2A, in the coordinates (the coefficient coordinates) after the transformation, the "1LL" component is disposed on an upper left, the "1HL" component is disposed on an upper right, the "1LH" component is disposed on a lower left, and the "1HH" component is disposed on a lower right.

Then, the transform section 11 obtains four components ("2LL" component, "2HL" component, "2LH" component, and "2HH" component) in a similar manner based on the data in the "1LL" component. Each of the "2LL" component, the "2HL" component, the "2LH" component, and the "2HH" component includes the number of pieces of coefficient data C equivalent to one sixteenth of the number of pieces of pixel data included in the frame image F. Then, the transform section 11 similarly disposes these components in a region where the "1LL" component is disposed in FIG. 2A in a similar manner (FIG. 2B).

Further, the transform section 11 obtains four components ("3LL" component, "3HL" component, "3LH" component, and "3HH" component) in a similar manner based on the data in the "2LL" component. Each of the "3LL" component, the "3HL" component, the "3LH" component, and the "3HH" component includes the number of pieces of the coefficient data C equivalent to one sixty-fourth of the number of pieces of pixel data included in the frame image F. Then, the transform section 11 disposes these components in a region where the "2LL" component is disposed in FIG. 2B in a similar manner, to generate the coefficient data set DS as illustrated in FIG. 2C.

The transform section 11 performs the discrete wavelet transform multiple times (in this example, three times) based on the pixel data of the frame image F, to generate the coefficient data set DS that includes the same number of coefficient data C as the number of pixel data included in the frame image F.

The coefficient data C obtained in such a way has characteristics as described below. First, the importance of the coefficient data C is high as an absolute value of the coefficient data C is large. In other words, larger absolute value of the coefficient data C indicates that the component is large. Therefore, if the coefficient data C is replaced with "0", its influence to the image quality is large. In addition, the importance of the coefficient data C is changed by a coefficient coordinate D where the coefficient data C is disposed in the coefficient data set DS.

Figure 3:
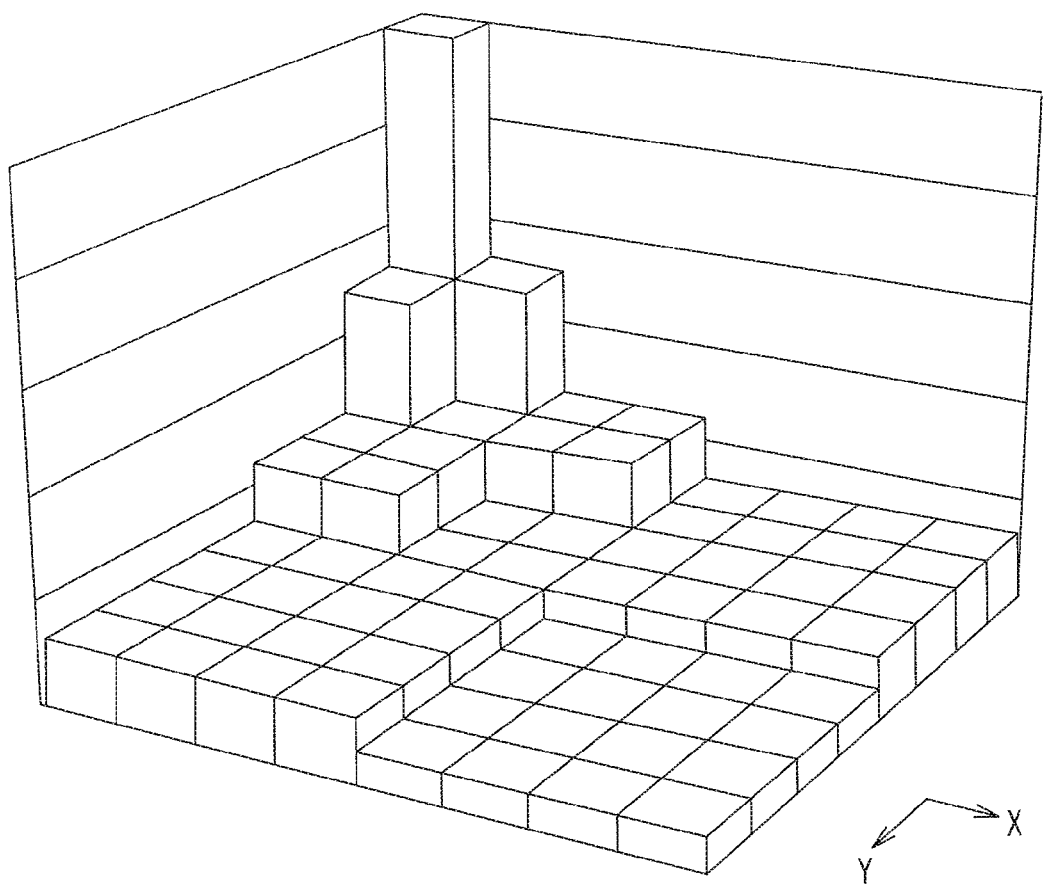
FIG. 3 is an explanatory diagram for explaining coordinate importance of coefficient data.

FIG. 3 illustrates coefficient coordinate dependency of the importance of the coefficient data C. The example illustrates a case where the discrete wavelet transform is performed three times, and the vertical axis indicates the importance of the coefficient data C. As illustrated in FIG. 3, the importance of the coefficient data C is higher as the coordinate x and the coordinate y are smaller. In other words, for example, the coefficient data C at the coefficient coordinate D where the coordinate x and the coordinate y are small is a low-frequency component (a component whose spatial frequency is low). Therefore, if the coefficient data C is replaced with "0", color shift may occur over a wide range in the frame image F, which largely affects the image quality.

In this way, the importance of the coefficient data C depends on the absolute value of the coefficient data C as well as depends on the coefficient coordinates. In the following description, the former is referred to as coefficient importance, and the latter is referred to as coordinate importance. As will be described later, the transmitter 1 compresses the image in consideration of the coefficient importance and the coordinate importance to reduce the code size after coding by the encoder 13 while suppressing degradation of the image quality.

The transform section 11 outputs the coefficient data C (the coefficient data set DS) generated in such a way as a coefficient signal SC as well as outputs the coefficient coordinates D where the respective coefficient data C are disposed, as a coordinate signal SD. In addition, the transform section 11 has a function of generating a mode selection signal SMODE and a coefficient enable signal SEN that control operation of the quantization parameter generation section 20.

The quantization parameter generation section 20 generate a quantization parameter Qf, based on the coefficient signal SC, the coordinate signal SD, the mode selection signal SMODE, and the coefficient enable signal SEN. Specifically, the quantization parameter generation section 20 has two operation modes, an accumulation mode M1 and a totalization mode M2, and the operation mode is selected by the mode selection signal SMODE. Then, in the accumulation mode M1, the quantization parameter generation section 20 generates a histogram HG, based on the coefficient data C contained in the coefficient signal SC, and in the subsequent totalization mode M2, the quantization parameter generation section 20 generates the quantization parameter Qf, based on the histogram HG. At that time, in this example, the quantization parameter generation section 20 sequentially sets process object ranges TR (for example, a range of a predetermined number of lines) in the coefficient data set DS relating to one frame image F, generates the histogram HG for each process object range TR, and generates the quantization parameter Qf based on the histogram HG.

Figure 4:
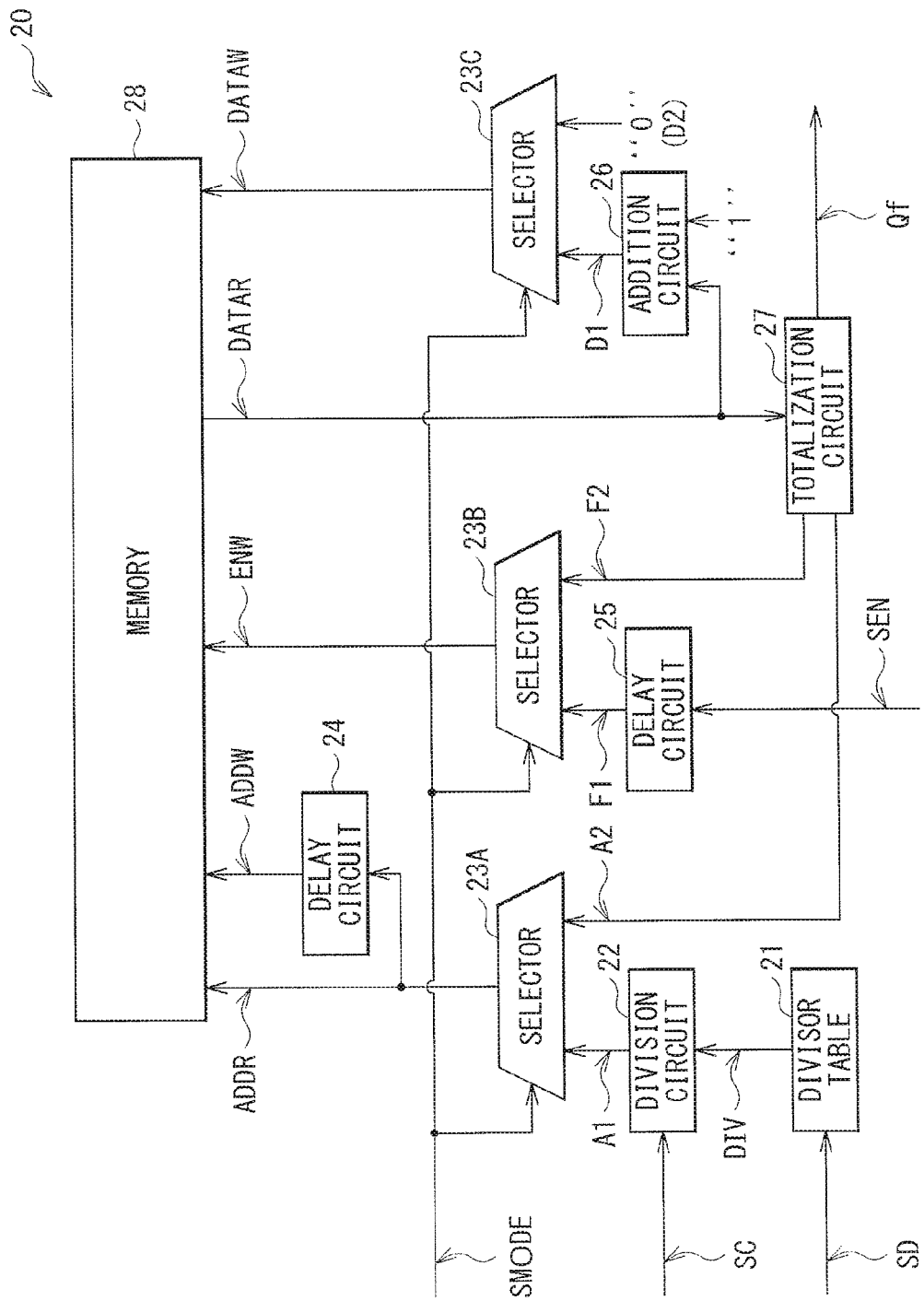
FIG. 4 is a block diagram illustrating a configuration example of a quantization parameter generation section illustrated in FIG. 1.

FIG. 4 illustrates a configuration example of the quantization parameter generation section 20. The quantization parameter generation section 20 includes a divisor table 21, a division circuit 22, selectors 23A to 23C, delay circuits 24 and 25, an addition circuit 26, a totalization circuit 27, and a memory 28.

The divisor table 21 is used to obtain divisor DIV, based on the coefficient coordinate D corresponding to each coefficient data C included in the coordinate signal SD. The divisor table 21 includes a lookup table indicating relationship between the coefficient coordinate D and the divisor DIV, and obtains the divisor DIV with use of the lookup table. Specifically, the divisor table 21 decreases the divisor DIV as the coordinate x and the coordinate y in the coefficient coordinate D are smaller, and increases the divisor DIV as the coordinate x and the coordinate y are larger. In other words, the coordinate importance dependency of the divisor DIV has characteristics reversed from the coordinate importance dependency of the coefficient data C illustrated in FIG. 3. Accordingly, the divisor DIV is set to a smaller value as the coordinate importance of the coefficient data C is higher, and is set to a larger value as the coordinate importance of the coefficient data C is lower.

The division circuit 22 is a circuit that obtains the absolute value of the coefficient data C included in the coefficient signal SC, divides the absolute value by the divisor DIV, and outputs a quotient as coefficient data A1. Note that the decimal places are rounded down in this example.

In this way, the quantization parameter generation section 20 divides the absolute value of the coefficient data C by the divisor DIV that is obtained by the coefficient coordinate D corresponding to the coefficient data C, to obtain the coefficient data A1. Specifically, the division circuit 22 divides the absolute value of the coefficient data C low in coordinate importance, by the divisor DIV that is larger than the divisor DIV of the coefficient data C high in coordinate importance. As a result, when the coordinate importance of the coefficient data C is low, the coefficient data A1 is smaller than that in the case where the coordinate importance of the coefficient data C is high. Accordingly, as will be described later, the quantization parameter generation section 20 is allowed to suppress influence from the coefficient data C low in coordinate importance to the quantization parameter Qf.

The selector 23A is a circuit that selects one of the coefficient data A1 supplied from the division circuit 22 and data A2 (described later) supplied from the totalization circuit 27, based on the mode selection signal SMODE. Specifically, when the mode selection signal SMODE indicates the accumulation mode M1, the selector 23A selects and outputs the coefficient data A1. When the mode selection signal SMODE indicates the totalization mode M2, the selector 23A selects and outputs the data A2. Then, the selector 23A supplies the selected data as a readout address ADDR to a readout address terminal (described later) of the memory 28 and the delay circuit 24.

The delay circuit 24 is a circuit that delays the output signal (the readout address ADDR) of the selector 23A by a predetermined time and outputs the delayed output signal. Further, the delay circuit 24 supplies the delayed signal as a write address ADDW to a write address terminal (described later) of the memory 28.

The delay circuit 25 is a circuit that delays the coefficient enable signal SEN by a predetermined time and outputs the delayed coefficient enable signal SEN as a flag F1. The delay amount of the delay circuit may be equivalent to the delay amount of the delay circuit 24, for example.

The selector 23B is a circuit that selects one of the flag F1 supplied from the delay circuit 25 and a flag F2 (described later) supplied from the totalization circuit 27, based on the mode selection signal SMODE. Specifically, when the mode selection signal SMODE indicates the accumulation mode M1, the selector 23B selects and outputs the flag F1. When the mode selection signal SMODE indicates the totalization mode M2, the selector 23B selects and outputs the flag F2. Then, the selector 23B supplies the selected flag as a write enable ENW to a write enable terminal (described later) of the memory 28.

The addition circuit 26 is a circuit that adds the value of readout data DATAR supplied from the readout data terminal (described later) of the memory 28 with a value "1" to output the resultant as data D1.

The selector 23C is a circuit that selects one of the data D1 supplied from the addition circuit 26 and data D2 indicating the value "0", based on the mode selection signal SMODE. Specifically, when the mode selection signal SMODE indicates the accumulation mode M1, the selector 23C selects and outputs the data D1. When the mode selection signal SMODE indicates the totalization mode M2, the selector 23C selects and outputs the data D2 ("0"). Then, the selector 23C supplies the selected data as write data DATAW to a write data terminal (described later) of the memory 28.

The totalization circuit 27 generates the quantization parameter Qf in the subsequent totalization mode M2, based on the histogram HG generated by accumulating data in the accumulation mode M1. Specifically, the totalization circuit 27 reads out the readout data DATAR from the memory 28 to obtain the histogram HG in the totalization mode M2.

Then, the totalization circuit 27 generates and outputs the quantization parameter Qf, based on the histogram HG and a parameter NNZ, as will be described later. At this time, the parameter NNZ is a preset parameter that is determined from transmission capacity of a transmission path for transmission of the transmission signal SIG.

Moreover, the totalization circuit 27 has a function of generating the data A2 and the flag F2 in the totalization mode M2 and initializing the memory 28 for operation in the subsequent accumulation mode M1.

In this example, the memory 28 is a dual-port static random access memory (SRAM). The memory 28 has the readout address terminal, the write address terminal, the write enable terminal, the readout data terminal, and the write data terminal. The readout address terminal is an input terminal receiving the readout address ADDR and is connected to the output terminal of the selector 23A. The write address terminal is an input terminal receiving the write address ADDW and is connected to the output terminal of the delay circuit 24. The write enable terminal is an input terminal receiving the write enable ENW and is connected to the output terminal of the selector 23B. The readout data terminal is an output terminal outputting the readout data DATAR and is connected to the totalization circuit 27 as well as the addition circuit 26. The write data terminal is an input terminal receiving the write data DATAW and is connected to the output terminal of the selector 23C.

With this configuration, in the accumulation mode M1, the quantization parameter generation section 20 generates the histogram HG. Specifically, as will be described later, the division circuit 22 supplies the coefficient data A1 as the readout address ADDR to the memory 28, and the memory 28 outputs data that is stored at the address indicated by the coefficient data A1, as the readout data DATAR. Then, the addition circuit 26 increments the value of the readout data DATAR to generate the data D1, and supplies the data D1 as the write data DATAW to the memory 28. Accordingly, in the memory 28, the value stored at the address indicated by the coefficient data A1 is incremented. These processes are repeated to generate the histogram HG for the coefficient data A1.

Then, in the subsequent totalization mode M2, the totalization circuit 27 reads out the histogram HG from the memory 28. Further, the totalization circuit 27 generates the quantization parameter Qf based on the histogram HG and the parameter NNZ.

Figure 5:
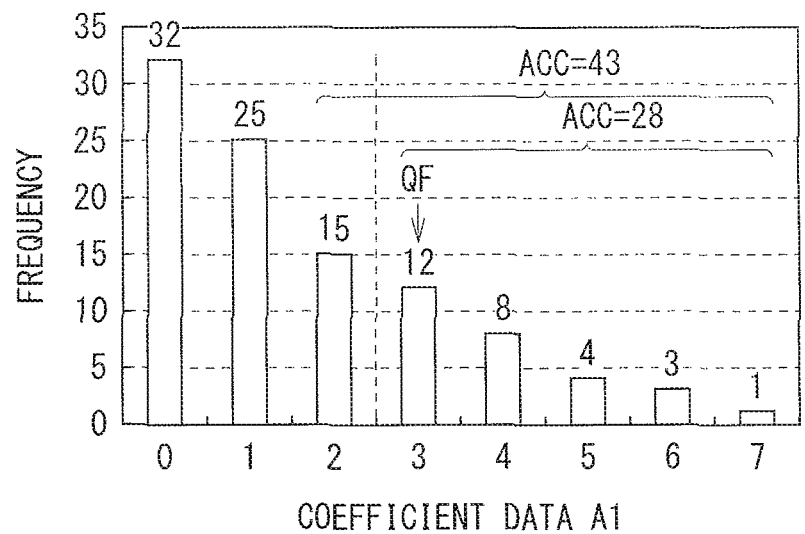
FIG. 5 is an explanatory diagram illustrating an operation example of the quantization parameter generation section illustrated in FIG. 4.

FIG. 5 illustrates an example of generating the quantization parameter Qf. In this example, the parameter NNZ is set to "28". The totalization circuit 27 sequentially adds frequencies in descending order of the coefficient data A1 to sequentially obtain accumulated values ACC. Specifically, in this example, the totalization circuit 27 adds the frequencies in order of the frequency "1" at the coefficient data A1=7, the frequency "3" at the coefficient data A1=6, the frequency "4" at the coefficient data A1=5, . . . , to obtain the accumulated values ACC. Then, the minimum value of the coefficient data A1 within a range of the coefficient data A1 where the accumulated values ACC do not exceed the parameter NNZ is defined as the quantization parameter Qf. Specifically, in this example, the accumulated value ACC within a range where the coefficient data A1 is "3" or more (A1≥3) is "28" (=1+3+4+8+12), which does not exceed the parameter NNZ. On the other hand, the accumulated value ACC within a range where the coefficient data A1 is "2" or more (A1≥2) is "43" (=1+3+4+8+12+15), which exceeds the parameter NNZ. Therefore, in this example, the totalization circuit 27 sets the quantization parameter Qf to "3". In this case, the coefficient data C relating to the coefficient data A1 lower than "3" (lower than the quantization parameter Qf) is quantized to "0" by quantization processing as will be described later.

Figure 6:
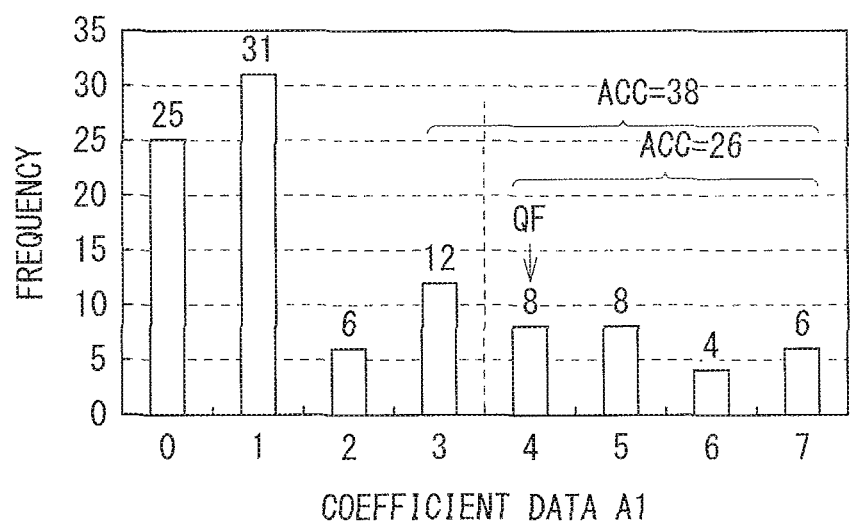
FIG. 6 is an explanatory diagram illustrating another operation example of the quantization parameter generation section illustrated in FIG. 4.

FIG. 6 illustrates another example of generating the quantization parameter Qf. In this example, the parameter NNZ is set to "26". In this example, the totalization circuit 27 adds the frequencies in order of the frequency "6" at the coefficient data A1=7, the frequency "4" at the coefficient data A1=6, the frequency "8" at the coefficient data A1=5, . . . , to obtain the accumulated values ACC. At this time, the accumulated value ACC within a range where the coefficient data A1 is "4" or more (A1≥4) is "26" (=6+4+8+8), which does not exceed the parameter NNZ. On the other hand, the accumulated value ACC within a range where the coefficient data A1 is "3" or more (A1≥3) is "38" (=6+4+8+8+12), which exceeds the parameter NNZ. Therefore, the totalization circuit 27 sets the quantization parameter Qf to "4". In this case, the coefficient data C relating to the coefficient data A1 lower than "4" (lower than the quantization parameter Qf) is quantized to "0" by the quantization processing as will be described later.

In the above-described way, the totalization circuit 27 generates the quantization parameter Qf, based on the histogram HG and the parameter NNZ. Then, the quantization parameter generation section 20 supplies the quantization parameter Qf to the quantization section 12.

As illustrated in FIG. 1, the quantization section 12 performs the quantization processing on the coefficient data C included in the coefficient signal SC, based on the coefficient signal SC, the coordinate signal SD, and the quantization parameter Qf, to generate the quantized data Q. At this time, the quantization section 12 is allowed to change the method of the quantization processing, depending on the coordinate importance indicated by the coefficient coordinate D relating to the coefficient data C that is to be subjected to the quantization processing.

Figure 7:
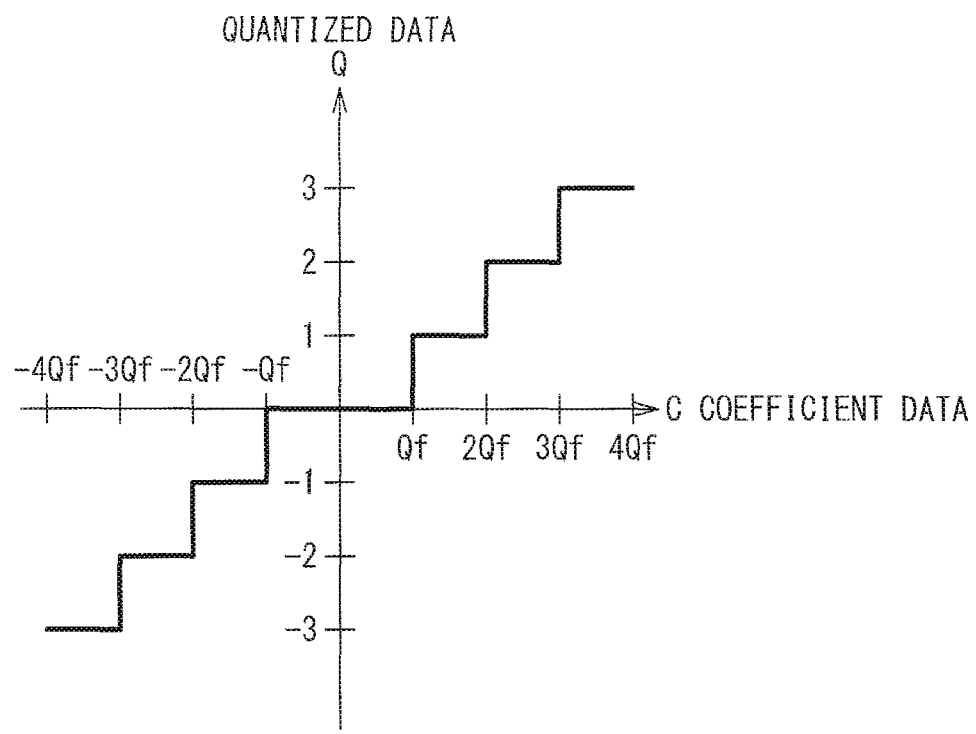
FIG. 7 is an explanatory diagram illustrating an operation example of a quantization section illustrated in FIG. 1.
Figure 8:
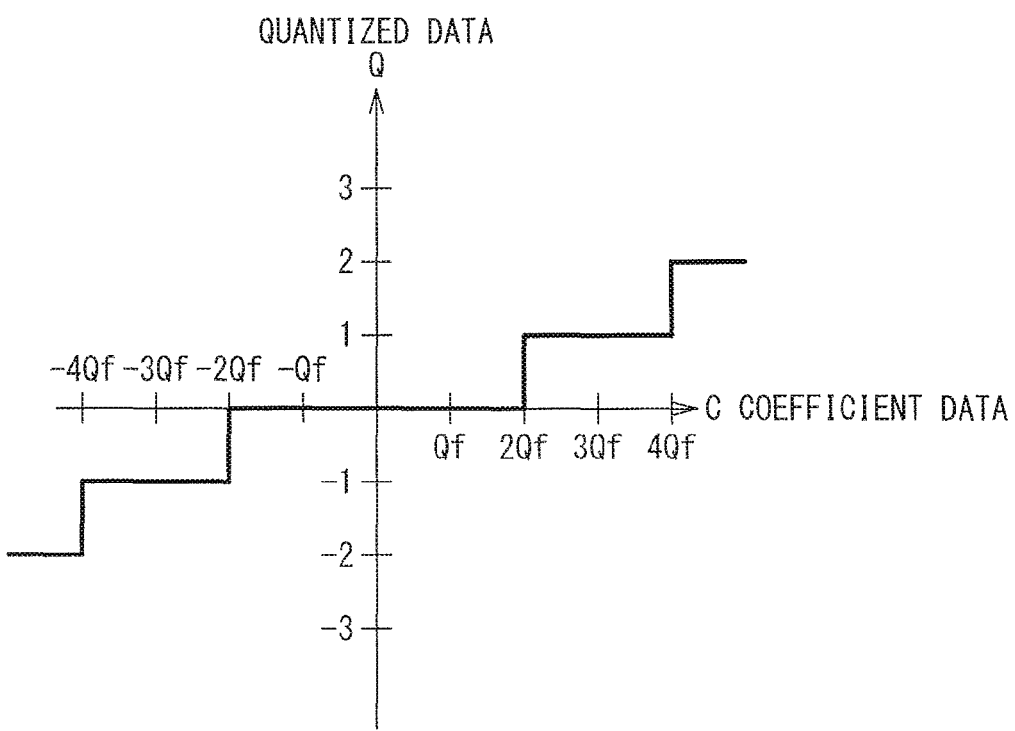
FIG. 8 is an explanatory diagram illustrating another operation example of the quantization section illustrated in FIG. 1.

FIG. 7 illustrates the quantization processing on the coefficient data C highest in coordinate importance, and FIG. 8 illustrates the quantization processing on the coefficient data C slightly low in coordinate importance. In FIGS. 7 and 8, the horizontal axis indicates the coefficient data C, and the vertical axis indicates the quantized data Q.

When the coordinate importance is the highest, the quantization section 12 performs integer division with use of the quantization parameter Qf to quantize the coefficient data C as illustrated in FIG. 7. The coefficient data C having a value lower than that of the quantization parameter Qf is converted into the quantized data Q having the value of "0" by the quantization processing. In other words, the coefficient data C having the value lower than that of the quantization parameter Qf is considered to less affect the image quality, and therefore, is converted into the quantized data Q having the value of "0". Performing the quantization in this way makes it possible to reduce the code size after coding by the encoder 13 while suppressing degradation in image quality.

Moreover, when the coordinate importance is slightly low, the quantization section 12 performs the integer division with use of the value integral multiple (in this example, twice) of the quantization parameter Qf to quantize the coefficient data C as illustrated in FIG. 8. As a result, the coefficient data C low in coordinate importance is converted into the quantized data Q having a low value, which makes it possible to reduce the code size while suppressing degradation in image quality.

To perform such quantization processing, the quantization section 12 quantizes the coefficient data C used in obtaining the quantization parameter Qf, with use of the quantization parameter Qf. In other words, in this example, the quantization parameter generation section 20 generates the quantization parameter Qf for each process object range TR in the coefficient data set DS, and the quantization section 12 performs the quantization processing on the coefficient data C belonging to the process object range TR, with use of the quantization parameter Qf. Accordingly, the transmitter 1 is allowed to optimize the compression amount for each process object range TR.

The quantization section 12 outputs, as a quantized data signal SQ, the quantized data Q generated in such a way, and outputs, as a coordinate signal SD2, the coefficient coordinates D corresponding to the respective quantized data Q.

As illustrated in FIG. 1, the encoder 13 encodes the quantized data Q based on the quantized data signal SQ and the coordinate signal SD2 to generate codes CODE. In this example, the encoder 13 performs coding by Huffman coding method. Incidentally, the coding method is not limited thereto, and other coding methods may be employed.

At the time of coding the quantized data Q in this way, the encoder 13 performs coding in order from the quantized data Q relating to the coefficient data C high in coordinate importance (FIG. 3). Specifically, as illustrated in FIGS. 2C and 3, first, the encoder 13 encodes the quantized data Q corresponding to the "3LL" component, and then encodes the respective pieces of the quantized data Q corresponding to the "3HL" component and the "3LH" component. Then, the encoder 13 encodes the respective pieces of the quantized data Q corresponding to the "3HH" component, the "2HL" component, and the "2LH" component, then encodes the respective pieces of the quantized data Q corresponding to the "2HH" component, the "1HL" component, and the "1LH" component, and finally encodes the quantized data Q corresponding to the "1HH" component. In the transmission system 100, coding is performed in order from the quantized data Q relating to the coefficient data C high in coordinate importance (FIG. 3) in this way, which makes it possible to suppress degradation in image quality even if all of the codes CODE relating to the respective frame images F are not allowed to be transmitted to the receiver 9. In other words, in the transmission system 100, even if all of the codes CODE are not allowed to be transmitted to the receiver 9 and codes CODE low in importance that are located at latter half are lost, the image is allowed to be reproduced based on the codes CODE high in importance. Therefore, it is possible to suppress degradation in image quality.

The buffer memory 14 is a memory that temporarily holds the codes CODE output from the encoder 13, and may be formed of first-in first-out (FIFO) memory, for example.

The format analyzer 15 analyzes the format of the image signal supplied to the transmitter 1, based on the data enable signal DE, the vertical synchronization signal VS, and the horizontal synchronization signal HS. Specifically, the format analyzer 15 obtains image parameters such as an HV size, a front porch length, and a back porch length through the analysis. Then, the format analyzer 15 outputs, as a parameter signal SP, the image parameters together with a timing signal, based on the analysis result.

The header encoder 16 generates header information HI, based on the parameter signal SP and the quantization parameter Qf. Specifically, the header encoder 16 uses the image parameter and the timing signal that are supplied from the format analyzer 15, the quantization parameter Qf, an identification number NR for identification of the process object range TR, and the like, to generate the header information HI.

The MUX 17 generates the transmission signal SIG, based on the codes CODE supplied from the buffer memory 14, the header information HI supplied from the header encoder 16, and the clock signal CLK. In this example, the transmission signal SIG is formed of data signals DATA[1] and DATA[0] (hereinafter, referred to as DATA[1:0] as appropriate), a clock signal CLK2, and a flag signal FLAG.

Figure 9:
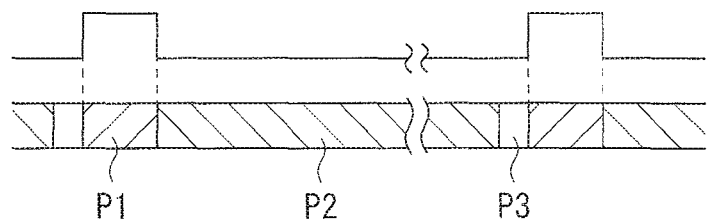
FIG. 9 is a timing chart illustrating an example of a transmission signal illustrated in FIG. 1.

FIG. 9 illustrates a timing chart of the transmission signal SIG, where (A) illustrates the flag signal FLAG, and (B) illustrates the data signals DATA[1:0]. The data signals DATA[1:0] include a header part P1, a code part P2, and a null part P3. The header part P1 is a part transmitting the header information HI, and the code part P2 is a part transmitting the codes CODE. Note that the null part P3 is a part substantially not including information. The null part P3 functions as a buffer absorbing increase and decrease of the code amount through change of its length. The flag signal FLAG is a signal that is at high level in a period during which the data signals DATA[1:0] indicate the header part P1 and is at low level in other periods.

The transmitter 1 transmits such a transmission signal SIG to the receiver 9 through the transmission path (a transmission cable in this example). Incidentally, although the data is transmitted using the two data signals DATA[1:0] in this example, the number of the data signals is not limited thereto, and the data may be transmitted using one or three or more data signals.

(Receiver 9)

The receiver 9 includes a demultiplexer (DEMUX) 91, a decoder 92, a header decoder 93, a timing signal generation section 94, an inverse quantization section 95, an inverse transform section 96, and a buffer memory 97.

The DEMUX 91 separates codes CODE2 and header information HI2 from the transmission signal SIG. The codes CODE2 and the header information HI2 correspond to the codes CODE and the header information HI in the transmitter 1, respectively.

The decoder 92 decodes the codes CODE2 to return the codes CODE2 to quantized data Q2. The quantized data Q2 corresponds to the quantized data Q in the transmitter 1. Then, the decoder 92 outputs the decoded quantized data Q2 as a quantized data signal SQ2.

The header decoder 93 decodes the header information HI2 to obtain the image parameter, the timing signal, a quantization parameter Qf2, an identification number NR2, and the like. The quantization parameter Qf2 and the identification number NR2 correspond to the quantization parameter Qf and the identification number NR in the transmitter 1, respectively. Further, the header decoder 93 outputs the image parameter and the timing signal as a parameter signal SP2 and outputs the quantization parameter Qf2.

The timing signal generation section 94 generates, based on the parameter signal SP2, a control signal controlling operation of the buffer memory 97 as well as generates a data enable signal DE2, a vertical synchronization signal VS2, and a horizontal synchronization signal HS2.

The inverse quantization section 95 performs inverse quantization processing based on the quantized data signal SQ2 and the quantization parameter Qf2 to obtain coefficient data C2. The coefficient data C2 corresponds to the coefficient data C in the transmitter 1. Further, the inverse quantization section 95 outputs the coefficient data C2 as a coefficient signal SC2.

The inverse transform section 96 performs inverse transform based on the coefficient signal SC2 to generate pixel data. Specifically, in this example, the inverse transform section 96 performs inverse transform of the discrete wavelet transform to generate the pixel data.

The buffer memory 97 is a memory that temporarily holds the pixel data output from the inverse transform section 96, and for example, may be configured of a FIFO memory. Further, the buffer memory 97 outputs the pixel data as the pixel signal YC2, based on the control signal supplied from the timing signal generation section 94.

Then, the receiver 9 outputs the clock signal CLK2 included in the transmission signal SIG, in addition to the pixel signal YC2, the data enable signal DE2, the vertical synchronization signal VS2, and the horizontal synchronization signal HS2.

Here, the quantization parameter generation section 20 and the quantization section 12 correspond to a specific example of "quantization section" in the present disclosure. The parameter NNZ corresponds to a specific example of "threshold" in the present disclosure. The encoder 13 corresponds to a specific example of "coding section" in the present disclosure.

(Operation and Function)

Subsequently, operation and a function of the transmission system 100 according to the first embodiment will be described.

(General Operation Outline)

First, general operation outline of the transmission system 100 is described with reference to FIG. 1 and the like. The transmitter 1 generates the transmission signal SIG based on the pixel signal YC, the data enable signal DE, the vertical synchronization signal VS, the horizontal synchronization signal HS, and the clock signal CLK. Specifically, the transform section 11 performs the discrete wavelet transform on each frame image F, based on the pixel signal YC and the data enable signal DE, to obtain the coefficient data C, and generates the coefficient signal SC and the coordinate signal SD. The quantization parameter generation section 20 generates the quantization parameter Qf for each process object range TR, based on the coefficient signal SC, the coordinate signal SD, and the like. The quantization section 12 performs the quantization processing for each process object range TR, based on the coefficient signal SC, the coordinate signal SD, and the quantization parameter Qf, to obtain the quantized data Q, and generates the quantized data signal SQ and the coordinate signal SD2. The encoder 13 encodes the quantized data Q, based on the quantized data signal SQ and the coordinate signal SD2, to generate the codes CODE. The buffer memory 14 temporarily holds the codes CODE. The format analyzer 15 analyzes the format of the image signal supplied to the transmitter 1, based on the data enable signal DE, the vertical synchronization signal VS, and the horizontal synchronization signal HS, to generate the parameter signal SP. The header encoder 16 generates the header information HI based on the parameter signal SP and the quantization parameter Qf. The MUX 17 generates the transmission signal SIG based on the codes CODE, the header information HI, and the clock signal CLK.

The receiver 9 receives the transmission signal SIG, and generates the pixel signal YC2, the data enable signal DE2, the vertical synchronization signal VS2, the horizontal synchronization signal HS2, and the clock signal CLK2. Specifically, the DEMUX 91 separates the codes CODE2 and the header information HI2 from the transmission signal SIG. The decoder 92 decodes the codes CODE2 to return the codes CODE2 to the quantized data Q2, and generates the quantized data signal SQ2. The header decoder 93 decodes the header information HI2 to generate the parameter signal SP2 and the quantization parameter Qf2. The timing signal generation section 94 generates the control signal controlling the operation of the buffer memory 95, based on the parameter signal SP2, and generates the data enable signal DE2, the vertical synchronization signal VS2, and the horizontal synchronization signal HS2. The inverse quantization section 95 performs the inverse quantization processing based on the quantized data signal SQ2 and the quantization parameter Qf2, to obtain the coefficient data C2 and to generate the coefficient signal SC2. The inverse transform section 96 performs the inverse transform based on the coefficient signal SC2 to generate the pixel data. The buffer memory 97 temporarily holds the pixel data output from the inverse transform section 96, and outputs the pixel data as the pixel signal YC2, based on the control signal supplied from the timing signal generation section 94.

Then, operation of the quantization parameter generation section 20 will be described in detail. First, operation in the accumulation mode M1 is described, and operation in the totalization mode M2 is then described.

(Detailed Operation in Accumulation Mode M1)

The quantization parameter generation section 20 generates the histogram HG for the coefficient data A1 relating to the coefficient data C in the accumulation mode M1. The operation is described in detail below.

Figure 10:
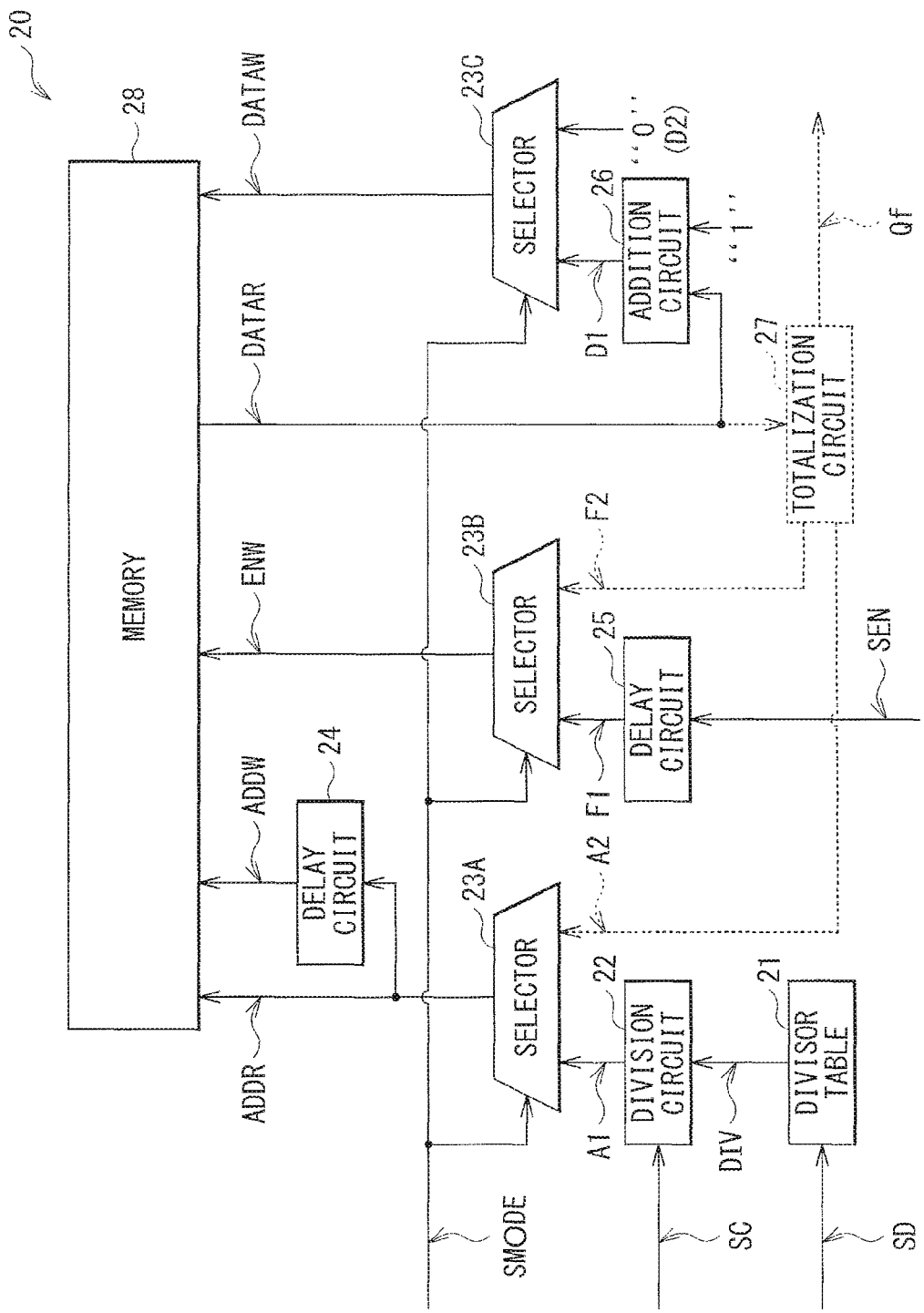
FIG. 10 is an explanatory diagram illustrating an operation example in an accumulation mode of the quantization parameter generation section illustrated in FIG. 4.

FIG. 10 illustrates operation of the quantization parameter generation section 20 in the accumulation mode M1. In FIG. 10, circuit blocks and signal lines that are drawn by solid lines contribute to the operation, and circuit blocks and signal lines that are drawn by dashed lines do not substantially contribute to the operation. In the accumulation mode M1, through the mode selection signal SMODE, the transform section 11 instructs the selector 23A to select and output the coefficient data A1, instructs the selector 23B to select and output the flag F1, and instructs the selector 23C to select and output the data D1.

Figure 11:
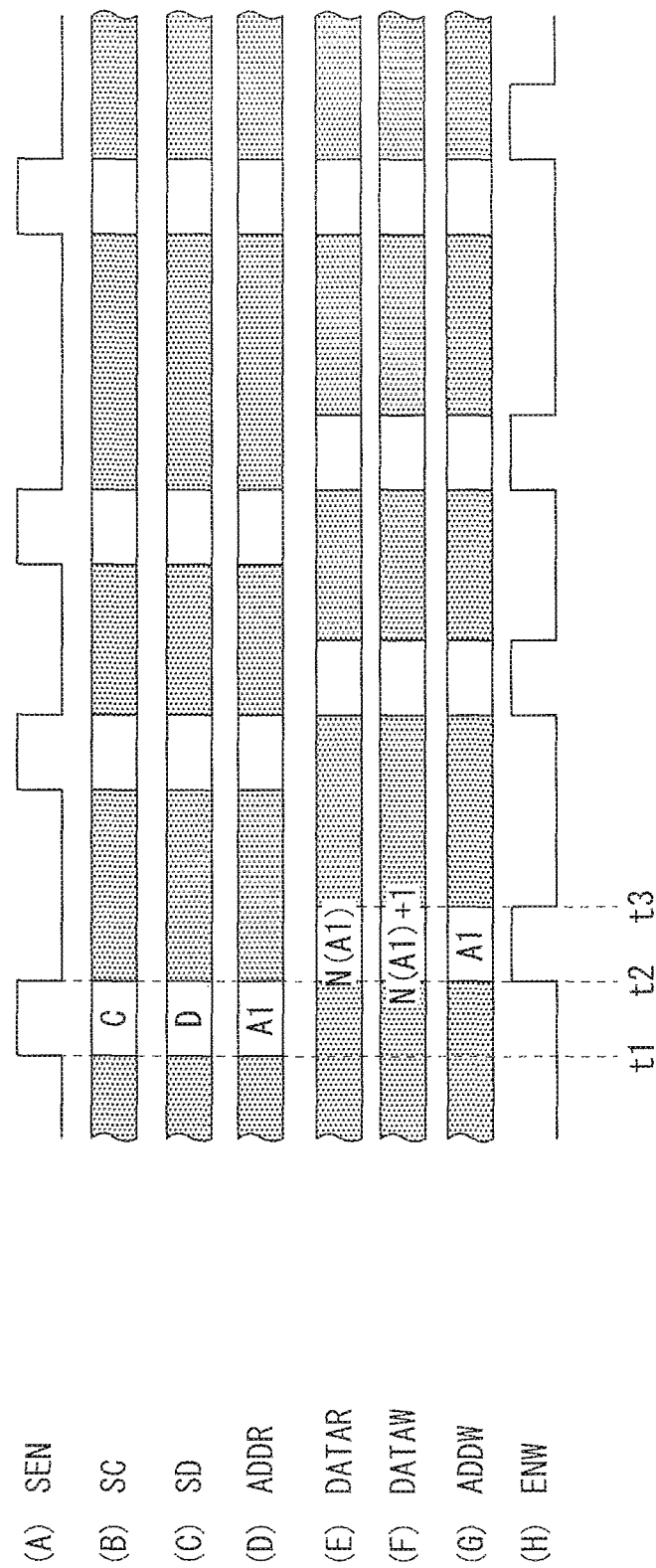
FIG. 11 is a timing chart illustrating an operation example in the accumulation mode of the quantization parameter generation section illustrated in FIG. 4.

FIG. 11 illustrates a timing chart of the quantization parameter generation section 20 in the accumulation mode M1, where (A) illustrates the coefficient enable signal SEN, (B) illustrates the coefficient signal SC, (C) illustrates the coordinate signal SD, (D) illustrates the readout address ADDR, (E) illustrates the readout data DATAR, (F) illustrates the write data DATAW, (G) illustrates the write address ADDW, and (H) illustrates the write enable ENW.

In the quantization parameter generation section 20, in a period of timings t1 to t3, the value stored at the address indicated by the coefficient data A1 in the memory 28 is incremented. The operation will be described in detail below.

First, in a period of timings t1 to t2, the coefficient enable signal SEN becomes at high level ((A) of FIG. 11). Then, the divisor table 21 generates the divisor DIV based on the coefficient coordinate D included in the coordinate signal SD((C) of FIG. 11). Moreover, the division circuit 22 divides the value of the coefficient data C included in the coefficient signal SC, by the divisor DIV to obtain the coefficient data A1, and supplies the coefficient data A1 as the readout address ADDR to the memory 28 ((D) of FIG. 11).

Therefore, the memory 28 outputs the value "N(A1)" stored at the address indicated by the coefficient data A1 as the readout data DATAR ((E) of FIG. 11). Then, the addition circuit 26 adds the value N(A1) to the value "1" to generate the value "N(A1)+1", and supplies the generated value as the write data DATAW to the memory 28 ((F) of FIG. 11). In addition, the delay circuit 24 delays the coefficient data A and outputs and supplies the delayed coefficient data A1 as the write address ADDW to the memory 28 ((G) of FIG. 11).

Then, in a period of timings t2 to t3, the write enable ENW becomes at high level ((H) of FIG. 11). Accordingly, the value "N(A1)+1" is written to the address indicated by the coefficient data A1 in the memory 28.

In this way, the value stored at the address indicated by the coefficient data A1 in the memory 28 is incremented. The operation is performed every time the coefficient data C and the like are supplied from the transform section 11. As a result, the quantization parameter generation section 20 generates the histogram HG for the coefficient data A1.

(Detailed Operation in Totalization Mode M2)

The quantization parameter generation section 20 generates the quantization parameter Qf based on the histogram HG for the coefficient data A1 in the totalization mode M2. The operation will be described in detail below.

Figure 12:
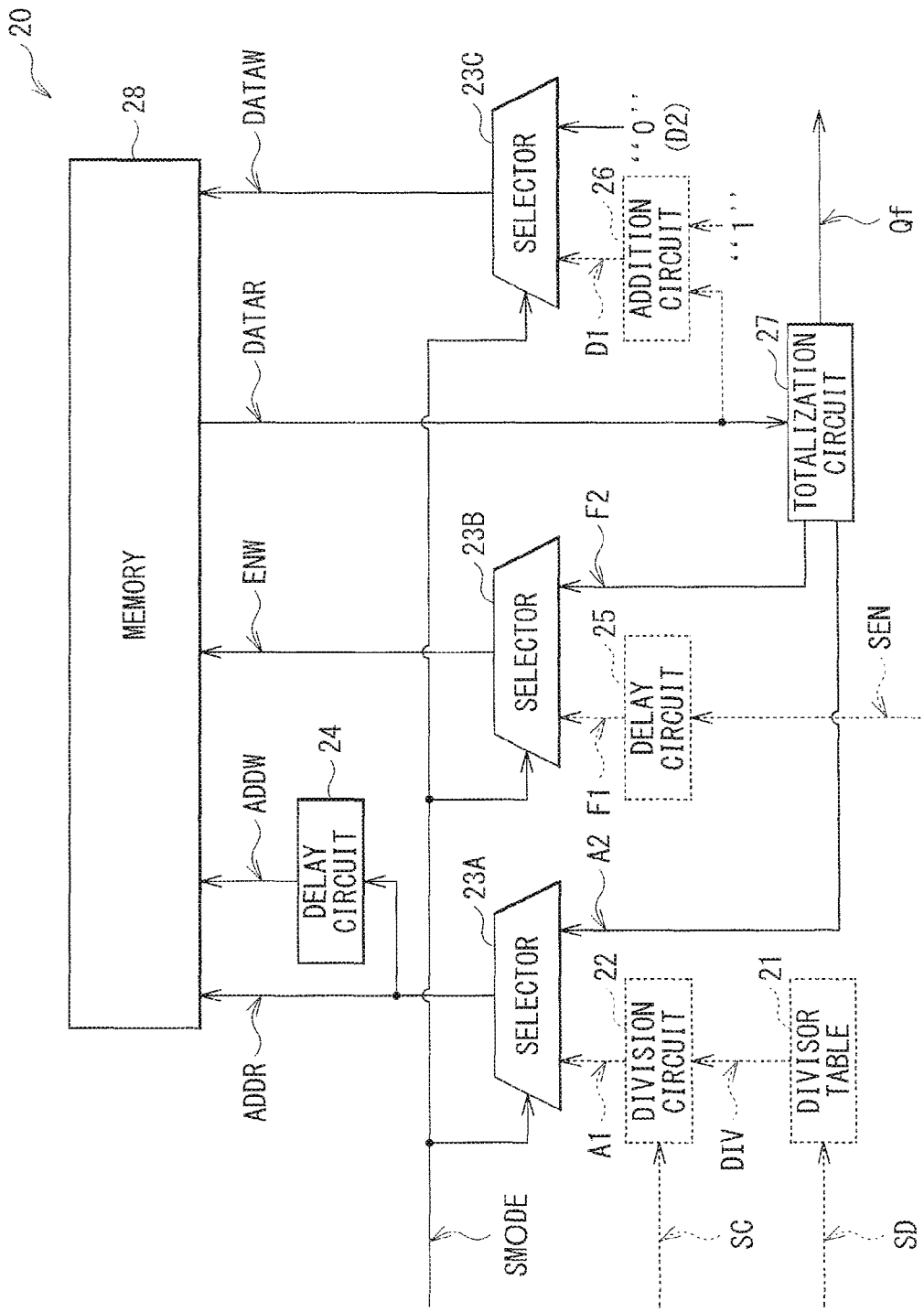
FIG. 12 is an explanatory diagram illustrating an operation example in a totalization mode of the quantization parameter generation section illustrated in FIG. 4.

FIG. 12 illustrates operation of the quantization parameter generation section 20 in the totalization mode M2. In FIG. 12, circuit blocks and signal lines that are drawn by solid lines contribute to the operation, and circuit blocks and signal lines that are drawn by dashed lines do not substantially contribute to the operation. In the totalization mode M2, through the mode selection signal SMODE, the transform section 11 instructs the selector 23A to select and output the data A2, instructs the selector 23B to select and output the flag F2, and instructs the selector 23C to select and output the data D2 ("0").

Figure 13:
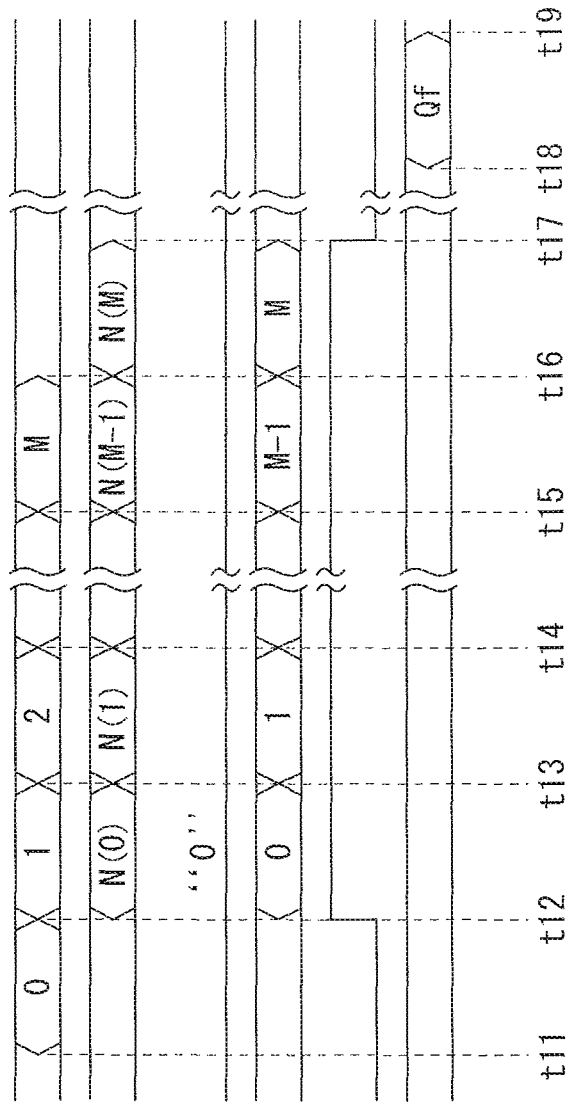
FIG. 13 is a timing chart illustrating an operation example in the totalization mode of the quantization parameter generation section illustrated in FIG. 4.

FIG. 13 illustrates a timing chart of the quantization parameter generation section 20 in the totalization mode M2, where (A) illustrates the readout address ADDR, (B) illustrates the readout data DATAR, (C) illustrates the write data DATAW, (D) illustrates the write address ADDW, (E) illustrates the write enable ENW, and (F) illustrates the quantization parameter Qf.

In a period of timings t11 to t12, the totalization circuit 27 outputs the data A2 indicating "0", and supplies the data A2 as the readout address ADDR to the memory 28 ((A) of FIG. 13). Then, the totalization circuit 27 sequentially increments the value of the data A2, and similarly supplies the data A2 as the readout address ADDR to the memory 28. In this way, the totalization circuit 27 sequentially sets all addresses (0 to M) in the address space of the memory 28 in a period of timings t11 to t16.

The memory 28 outputs the value "N(0)" stored at the address "0" as the readout data DATAR in a period of timings t12 to t13 ((B) of FIG. 13). Likewise, the memory 28 then sequentially outputs the value stored at the other addresses as the readout data DATAR according to the readout addresses ADDR. In this way, the memory 28 sequentially outputs the values (N(0) to N(M)) at all of the addresses (0 to M) in the address space of the memory 28 as the readout data DATAR, in a period of timings t12 to t17. As a result, for example, the totalization circuit 27 may obtain a histogram illustrated in FIG. 14.

Moreover, the totalization circuit 27 sets the flag F2 to the high level, and supplies the flag F2 as the write enable ENW to the memory 28 in the period of timings t12 to t17 ((E) of FIG. 13). The delay circuit 24 delays the data A2 to output "0" in the period of the timings t12 to t13, and supplies the data A2 indicating "0" as the write address ADDW to the memory 28 ((D) of FIG. 13). At this time, the memory 28 is supplied with the write data DATAW indicating "0" ((C) of FIG. 13). Accordingly, the value "0" is written to the address "0" in the memory 28. After that, the delay circuit 24 delays the data A2 that is sequentially incremented, and supplies the data A2 as the write address ADDW to the memory 28. In this way, the value "0" is written to all of the addresses (0 to M) in the address space of the memory 28 in the period of timings t12 to t17. In other words, the memory 28 is initialized.

The totalization circuit 27 obtains the quantization parameter Qf based on the histogram HG read from the memory 28 and the parameter NNZ. Then, the totalization circuit 27 outputs and supplies the quantization parameter Qf to the quantization section 12 in a period of timings t18 to t19.

Figure 14:
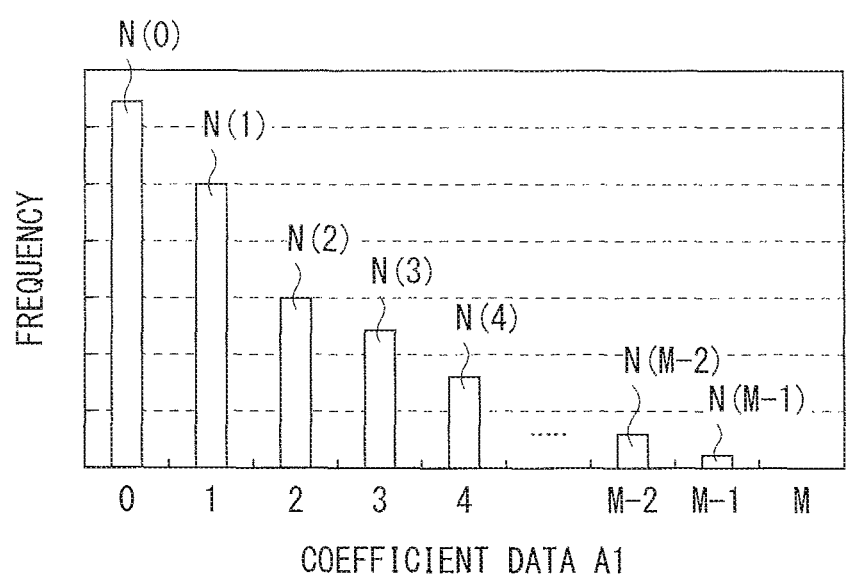
FIG. 14 is an explanatory diagram illustrating an example of a histogram generated by the quantization parameter generation section illustrated in FIG. 4.
Figure 15:
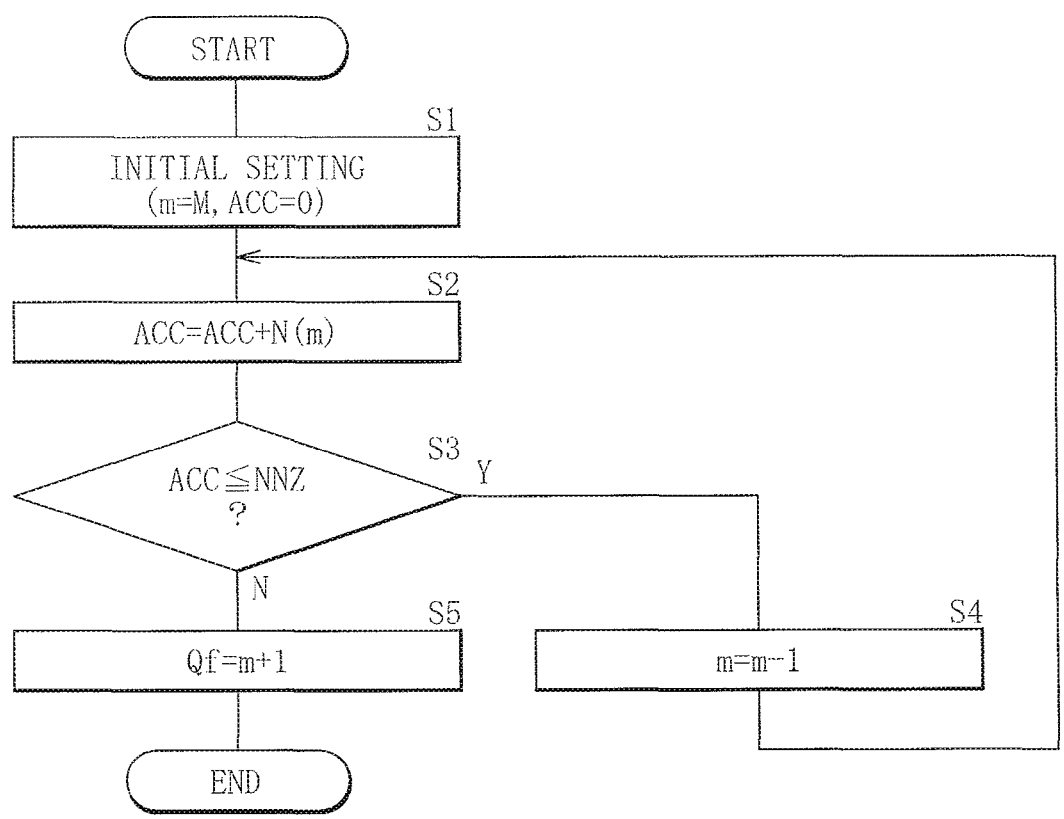
FIG. 15 is a flowchart illustrating an operation example in the totalization mode of the quantization parameter generation section illustrated in FIG. 4.

FIG. 15 illustrates a flowchart when the quantization parameter Qf is generated based on the histogram HG and the parameter NNZ. In this example, the quantization parameter Qf is obtained based on the histogram HG illustrated in FIG. 14. Herein, m is a variable, and N(m) indicates the frequency at the coefficient data A1=m in the histogram HG as illustrated in FIG. 14.

First, the totalization circuit 27 performs initial setting (step S1). Specifically, the totalization circuit 27 sets the variable m to M (m=M) and initializes the accumulated value ACC (ACC=0).

Then, the totalization circuit 27 resets a sum (ACC+N(m)) of the accumulated value ACC and the frequency N(m) as the accumulated value ACC (step S2).

Next, the totalization circuit 27 determines whether the accumulated value ACC is equal to or lower than the parameter NNZ (ACC≤NNZ) (step S3). When the accumulated value ACC is equal to or lower than the parameter NNZ, the process proceeds to step S4, whereas when the accumulated value ACC is larger than the parameter NNZ, the process proceeds to step S5.

At the step S3, when it is determined that the accumulated value ACC is equal to or lower than the parameter NNZ, the totalization circuit 27 decrements the variable m (step S4), and the process proceeds to the step S2 again. In this way, the totalization circuit 27 repeats the processes at the steps S2 to S4 until the accumulated value ACC exceeds the parameter NNZ.

At the step S3, when it is determined that the accumulated value ACC is larger than the parameter NNZ, the totalization circuit 27 sets a value that is obtained by adding "1" to the value of the variable m at this time, as the quantization parameter Qf (step S5). In other words, the totalization circuit 27 sets, as the quantization parameter Qf, the minimum value of the variable m in a range of the variable m where the accumulated value ACC is equal to or lower than the parameter NNZ (ACC≤NNZ).

This is the end of the flow.

The totalization circuit 27 obtains the quantization parameter Qf based on the histogram HG and the parameter NNZ in such a way. The parameter NNZ has the following features. As is apparent from FIG. 15 and the like, the quantization parameter Qf is smaller as the parameter NNZ is larger. Further, when the quantization parameter Qf is decreased, the number of pieces of the quantized data Q having the value other than "0", out of the quantized data Q in each process object range TR, is increased. In other words, the number of pieces of the quantized data Q having the value other than "0" out of the quantized data Q in each process object range TR is increased as the parameter NNZ is larger. Likewise, the number of pieces of the quantized data Q having the value other than "0" out of the quantized data Q in each process object range TR is decreased as the parameter NNZ is smaller. In other words, the parameter NNZ corresponds to the number of pieces of the quantized data Q having the value other than "0" out of the quantized data Q in each process object range TR.

When the parameter NNZ is set to a large value and the number of pieces of the quantized data Q having the value other than "0" is increased, the code size after coding is increased. Thus, the code size may exceed the transmission capacity of the transmission path. In addition, when the parameter NNZ is set to a small value and the number of pieces of the quantized data Q having the value other than "0" is decreased, the code size after coding is decreased. Thus, the transmission capacity may not be effectively utilized. Therefore, the parameter NNZ is allowed to be set according to the transmission capacity of the transmission path. In other words, when the transmission capacity of the transmission path is large, the parameter NNZ may be desirably set to a large value, and when the transmission capacity is small, the parameter NNZ may be desirably set to a small value. In this way, setting the parameter NNZ according to the transmission capacity of the transmission path makes it possible to effectively utilize the transmission capacity.

(Detailed Operation of Divisor Table 21 and Division Circuit 22)

Next, operation of the divisor table 21 and the division circuit 22 in the accumulation mode M1 will be described in detail.

FIG. 16 is a table illustrating an operation example of the divisor table 21 and the division circuit 22. In this example, eight pieces of coefficient data C are supplied to the division circuit 22. Note that, in this example, all pieces of the coefficient data C have a positive value. Further, in the divisor table 21, out of the eight pieces of the coefficient data C, the divisors DIV of left four pieces of the coefficient data C are set to "1", and the divisors DIV of right four pieces of the coefficient data C are set to "2". In other words, the left four pieces of the coefficient data C are high in coordinate importance, and the right four pieces of the coefficient data C are low in coordinate importance. The division circuit 22 divides each of the coefficient data C by corresponding divisor DIV to obtain eight pieces of coefficient data A1.

FIG. 17 illustrates the histogram HG of the eight pieces of coefficient data A1. In FIG. 17, hatched parts indicate the left four pieces of the coefficient data A1 in FIG. 16, and relate to the coefficient data C high in coordinate importance. On the other hand, non-hatched parts indicate the right four pieces of the coefficient data A1 in FIG. 16, and relate to the coefficient data C low in coordinate importance.

The totalization circuit 27 obtains the quantization parameter Qf based on such a histogram HG. For example, when the parameter NNZ is "4", the totalization circuit 27 sets the quantization parameter Qf to "5". In other words, in this example, the accumulated value ACC in a range where the coefficient data A1 is "5" or more (A1≥5) is "4", which does not exceed the parameter NNZ. On the other hand, the accumulated value ACC in a range where the coefficient data A1 is "4" or more is "5", which exceeds the parameter NNZ. Therefore, the totalization circuit 27 sets the quantization parameter Qf to "5". At this time, the parts (hatched parts) relating to the coefficient data C high in coordinate importance do not exist in a range where the coefficient data A1 is smaller than the value "5" of the quantization parameter Qf (A1<5). Therefore, in this example, the coefficient data C high in coordinate importance is not quantized to the quantized data Q having the value "0" by the quantization processing in the quantization section 12. In other words, in this example, since the coefficient data C high in coordinate importance does not lose information by the quantization processing, it is possible to reduce the code size while suppressing degradation in image quality.

On the other hand, if the divisor table 21 and the division circuit 22 are not provided and the histogram HG is obtained based on the absolute value of the coefficient data C, the image quality may be degraded as will be described below.

FIG. 18 illustrates the histogram HG of the coefficient data C. In this example, when the parameter NNZ is "4", the totalization circuit 27 sets the quantization parameter Qf to "8". In other words, in this example, the accumulated value ACC in a range where the coefficient data A1 is "8" or more (A1≥8) is "4", which does not exceed the parameter NNZ. On the other hand, the accumulated value ACC in a range where the coefficient data A1 is "7" or more (A1≥7) is "6", which exceeds the parameter NNZ. Therefore, the totalization circuit 27 sets the quantization parameter Qf to "8". At this time, one piece of the coefficient data C high in coordinate importance exists in a range where the coefficient data C is lower than the value "8" of the quantization parameter Qf (C<8). The coefficient data C becomes the quantized data Q having the value "0" by the quantization processing. In other words, the coefficient data C high in coordinate importance loses information by the quantization processing, which may cause degradation in image quality.

In other words, in the example of FIG. 18, one piece of the coefficient data C low in coordinate importance exists in a range where the coefficient data C is "8" or more (C≥8). This does not exist in the example of FIG. 13. Therefore, the coefficient data C high in coordinate importance is embedded in the coefficient data C low in coordinate importance, and thus the coefficient data C high in coordinate importance loses the information by the quantization processing.

On the other hand, in the quantization parameter generation section 20, the divisor table 21 and the division circuit 22 are provided, and the absolute value of the coefficient data C low in coordinate importance is divided by the divisor DIV that is larger than the divisor DIV of the coefficient data C high in coordinate importance. Accordingly, in the case where the coordinate importance of the coefficient data C is low, the coefficient data A1 is smaller than that in the case where the coordinate importance of the coefficient data C is high. In other words, as illustrated in FIG. 17, the parts (non-hatched parts) relating to the coefficient data C low in coordinate importance are located on a left side as compared with the case where such division is not performed (FIG. 18). Accordingly, it is possible to reduce possibility that the coefficient data A1 relating to the coefficient data C high in coordinate importance is embedded in the coefficient data A1 relating to the coefficient data C low in coordinate importance, to reduce influence of the coefficient data C low in coordinate importance to the quantization parameter Qf, and to reduce possibility of degradation in image quality.

(Memory Capacity of Buffer Memory 14, and Transmission Delay)

In the transmitter 1, the quantization parameter generation section 20 generates the quantization parameter Qf based on the coefficient data C, and the quantization section 12 uses the quantization parameter Qf to perform the quantization processing on the coefficient data C. Accordingly, in the transmitter 1, as will be described below in comparison with a comparative example 1, it is possible to reduce the memory capacity of the buffer memory 14 and to reduce the transmission delay.

Figure 19:
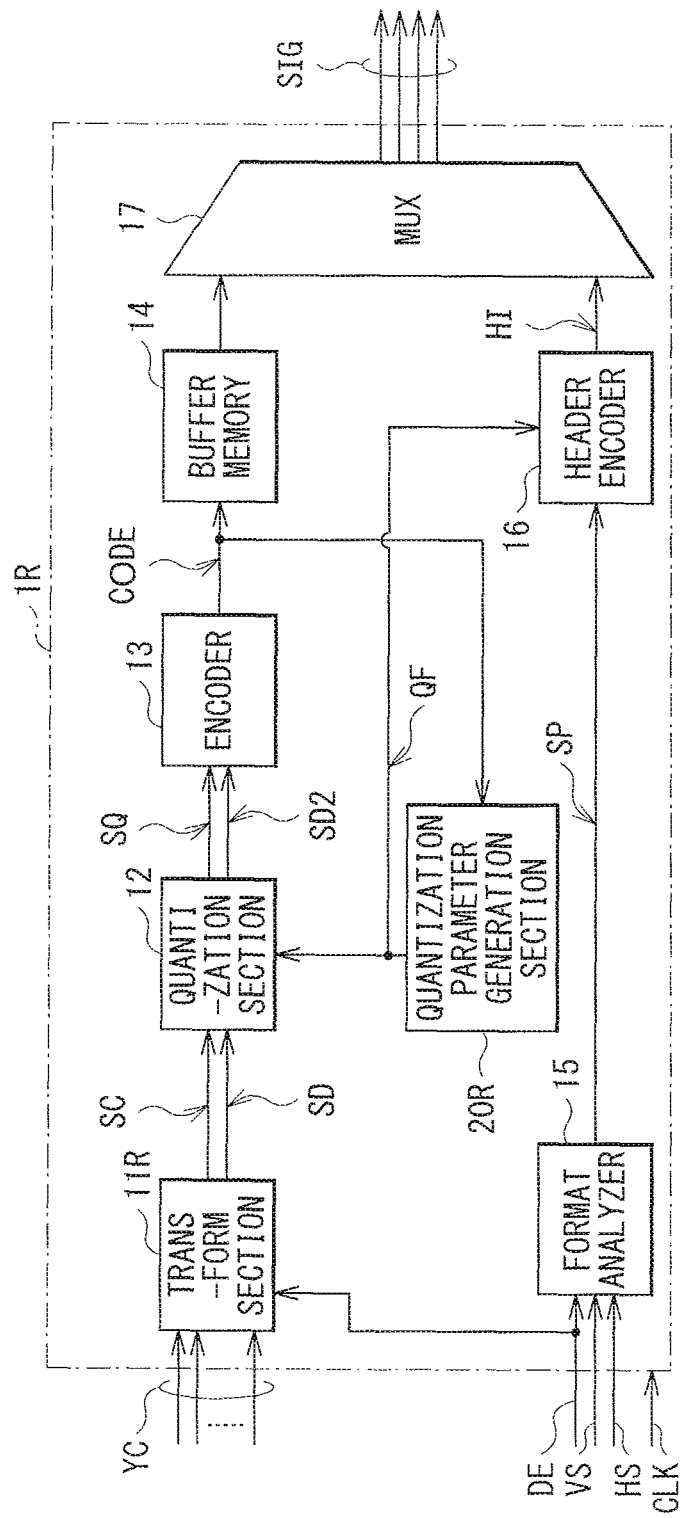
FIG. 19 is a block diagram illustrating a configuration example of a transmitter according to a comparative example of the first embodiment.

FIG. 19 illustrates a configuration example of a transmitter 1R according to a comparative example 1. The transmitter 1R includes a quantization parameter generation section 20R and a transform section 11R. The quantization parameter generation section 20R generates the quantization parameter Qf, based on the codes CODE for the plurality of process object ranges TR, generated by the encoder 13. The transform section 11R has a function similar to that of the transform section 11 according to the first embodiment except that the transform section 11R does not generate the mode selection signal SMODE and the coefficient enable signal SEN. Other configurations are similar to those in the first embodiment (FIG. 1).

Specifically, in the transmitter 1 according to the first embodiment, the quantization parameter generation section 20 generates the quantization parameter Qf based on the coefficient data C belonging to one process object range TR, and the quantization section 12 uses the quantization parameter Qf to perform the quantization processing on the coefficient data C belonging to the process object range TR. On the other hand, in the transmitter 1R according to the comparative example 1, the quantization parameter generation section 20R generates the quantization parameter Qf based on the codes CODE for the plurality of process object ranges TR, generated by the encoder 13, and the quantization section 12 performs the quantization processing on the coefficient data C belonging to the subsequent process object range TR, based on the quantization parameter Qf.

Figure 20:
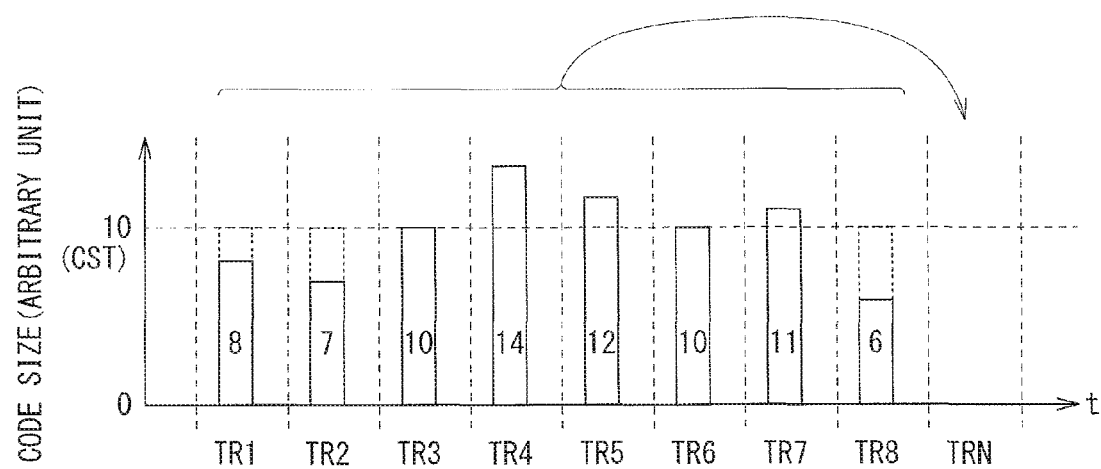
FIG. 20 is an explanatory diagram illustrating an operation example of the transmitter illustrated in FIG. 19.

FIG. 20 schematically illustrates an operation example of the transmitter 1R. The horizontal axis indicates time, and the vertical axis indicates the code size of the code that is quantized and coded based on the data of each process object range TR. In this example, the quantization parameter generation section 20R generates the quantization parameter Qf based on the codes CODE for eight process object ranges TR1 to TR8 that are previously processed, and the quantization section 12 performs the quantization processing on the coefficient data C belonging to the subsequent process object range TRN, based on the quantization parameter Qf. Here, a value CST indicates a code size calculated from the transmission capacity of the transmission path, and is a target value of quantization and coding of the coefficient data C by the transmitter 1R. In this example, the value CST is set to "10".

In this example, for example, the code size corresponding to a first process object range TR1 is "8", the code size corresponding to a second process object range TR2 is "7", and the code size corresponding to an eighth process object range TR8 is "6". In other words, in each of these process object ranges TR1, TR2, and TR8, the code size is lower than the target value (CST), and has a remaining capacity as compared with the transmission capacity of the transmission path. On the other hand, for example, the code size corresponding to a fourth process object range TR4 is "14", the code size corresponding to a fifth process object range TR5 is "12", and the code size corresponding to a seventh process object range TR7 is "11". In other words, in each of these process object ranges TR4, TR5, and TR7, the code size is larger than the target value (CST), and exceeds the transmission capacity of the transmission path.

The quantization parameter generation section 20R obtains the quantization parameter Qf for processing of the subsequent process object range TRN, based on the codes CODE for previous eight process object range TR1 to TR8. Specifically, when the average value of the code sizes in the previous eight process object ranges TR1 to TR8 is larger than the target value CST, the quantization parameter generation section 20R sets the quantization parameter Qf to be slightly high and reduces the code size in the subsequent process object range TRN. Moreover, when the average value of the code sizes in the previous eight process object ranges TR1 to TR8 is lower than the target value CST, the quantization parameter generation section 20R sets the quantization parameter Qf to be slightly low, and increases the code size in the subsequent process object range TRN. In other words, since the code size is changed depending not only on the quantization parameter Qf but also on the image itself, the codes CODE are generated, and according to its code size, the quantization parameter Qf of the subsequent process object range TRN is adjusted. In this way, the quantization parameter generation section 20R performs feedback control on the quantization parameter Qf so that the average value of the code sizes in the plurality of process object ranges TR becomes close to the target value CST.

In such a configuration, to effectively utilize the transmission capacity of the transmission path, for example, in the example of FIG. 20, after the code CODE corresponding to the process object range TR1 is transmitted, it is necessary to transmit the code CODE corresponding to the process object range TR2 subsequently. In other words, since the code size corresponding to the process object range TR1 is smaller than the target value CST, leftover time may be desirably used for transmission of the codes CODE corresponding to the process object ranges TR4, TR5, and TR7 that have the large code size. Accordingly, in the transmitter 1R, for example, the codes CODE for several tens of process object ranges TR may be temporarily stored in the buffer memory 14, and the codes CODE are read out from the buffer memory 14 at a rate corresponding to the transmission capacity of the transmission path. In such a case, a large-capacity memory is necessary as the buffer memory 14.

Figure 21:
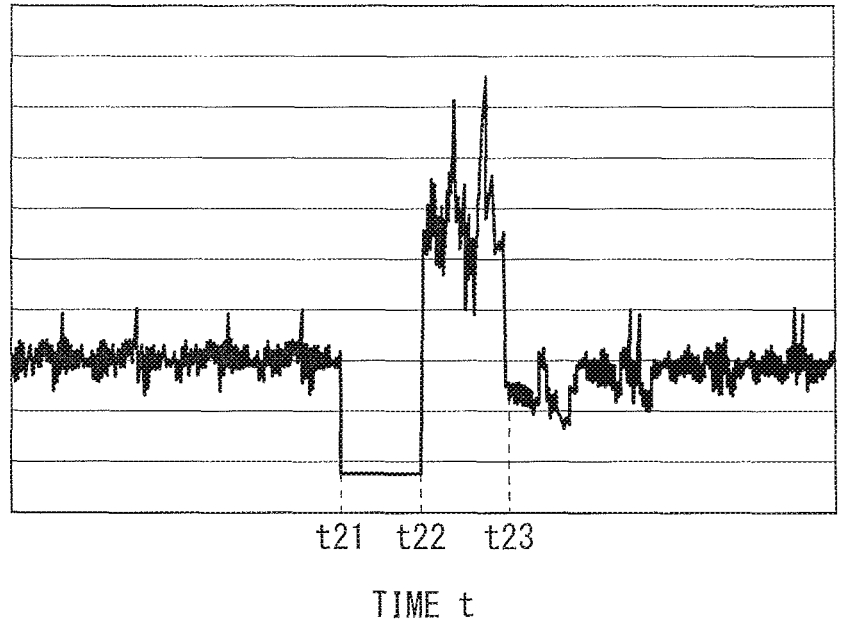
FIG. 21 is another explanatory diagram illustrating the operation example of the transmitter illustrated in FIG. 19.

FIG. 21 illustrates change of the code size with time in the case where a moving picture is transmitted by the transmitter 1R. In this example, the transmitter 1R transmits a moving picture in which an image is drastically changed upon application of flash light to an object at the timing t21. Accordingly, the code size is temporarily decreased in a period of timings t21 to t22, and considerably increased in a subsequent period of timings t22 to t23. This increase is caused by the fact that the quantization parameter generation section 20R obtains the quantization parameter Qf in the subsequent process object range, based on the code size of the plurality of previous process object ranges. In other words, since the code size becomes smaller in the period of timings t21 to t22, the quantization parameter generation section 20R decreases the quantization parameter Qf at the timing t22, and as a result, the code size is increased. In this way, in the transmitter 1R, the code size may be temporarily increased considerably. Therefore, it is necessary to increase the memory capacity of the buffer memory 14 in order to temporarily store the codes.

In addition, when the memory capacity of the buffer memory 14 is large in such a way, the time between writing of the code CODE in the buffer memory 14 until readout is increased, which may increase the transmission delay. In this way, the transmission system large in transmission delay is not desirable in some applications in some cases. Examples of such applications may include a transmission system necessitating real time property. Specifically, for example, when the system is applied to an application in which a camera shooting a rear side of a vehicle is provided and a driver drives while viewing captured pictures, the real time property is lost by the transmission delay, which may disrupt safety.

On the other hand, in the transmitter 1 according to the first embodiment, the quantization parameter generation section 20 generates the quantization parameter Qf based on the coefficient data C belonging to one process object range TR, and the quantization section 12 uses the quantization parameter Qf to perform the quantization processing on the coefficient data C belonging to the process object range TR. In other words, the quantization parameter generation section 20 controls the quantization parameter Qf so that the code size in each process object range TR becomes close to the target value CST. As a result, the code sizes in the respective process object ranges TR are unified substantially, which makes it possible to reduce the memory capacity of the buffer memory 14.

Figure 22:
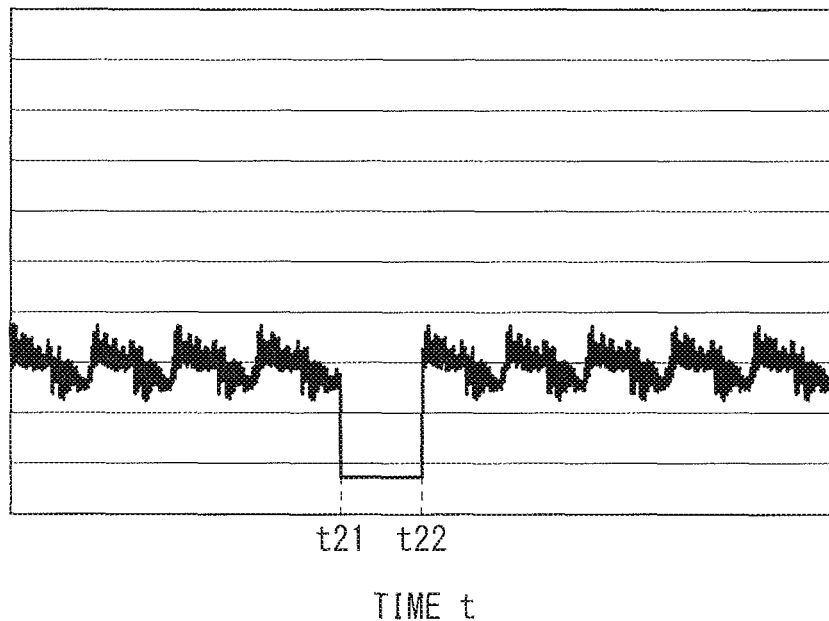
FIG. 22 is an explanatory diagram illustrating an operation example of a transmitter illustrated in FIG. 1.

FIG. 22 illustrates the change of the code size with time in the case where a moving picture is transmitted by the transmitter 1. Also in this example, as with the case of FIG. 21, the code size is temporarily decreased in the period of timings t21 to t22. However, unlike the case of FIG. 21, the code size is not increased after the subsequent timing t22. In other words, since the quantization parameter generation section 20 obtains the quantization parameter Qf based on the coefficient data C belonging to one process object range TR and performs the quantization processing on the coefficient data C belonging to the process object range TR, the code size in the period of timings t21 to t22 does not affect the code size after the timing t22. In this way, in the transmitter 1, unlike the case of the comparative example 1 (FIG. 21), since the possibility that the code size is drastically increased temporarily is allowed to be reduced, it is possible to reduce the memory capacity of the buffer memory 14.

As described above, since the memory capacity of the buffer memory 14 is allowed to be reduced, it is possible to reduce the transmission delay. Accordingly, the transmitter 1 is applicable to a transmission system necessitating the real time property.

(Effects)

As described above, in the first embodiment, the quantization parameter generation section generates the quantization parameter based on the coefficient data belonging to one process object range, and the quantization section uses the quantization parameter to perform the quantization processing on the coefficient data belonging to the process object range. Therefore, it is possible to reduce the memory capacity of the buffer memory, and to reduce the transmission delay.

In the first embodiment, the histogram is generated based on the coefficient data belonging to one process object range, and the quantization parameter is generated based on the histogram and the parameter NNZ that is set according to the transmission capacity of the transmission path. Accordingly, it is possible to effectively utilize the transmission capacity of the transmission path.

In the first embodiment, the divisor table and the division circuit are provided, and the absolute value of the coefficient data C low in coordinate importance is divided by the divisor that is larger than the divisor of the coefficient data C high in coordinate importance. Therefore, it is possible to reduce influence of the coefficient data C low in coordinate importance to the quantization parameter Qf, and to reduce possibility of degradation in image quality.

(Modification 1-1)

In the above-described first embodiment, the quantization parameter generation section 20 generates the histogram HG for the coefficient data A1; however, this is not limitative. The present modification will be described in detail below.

Figure 23:
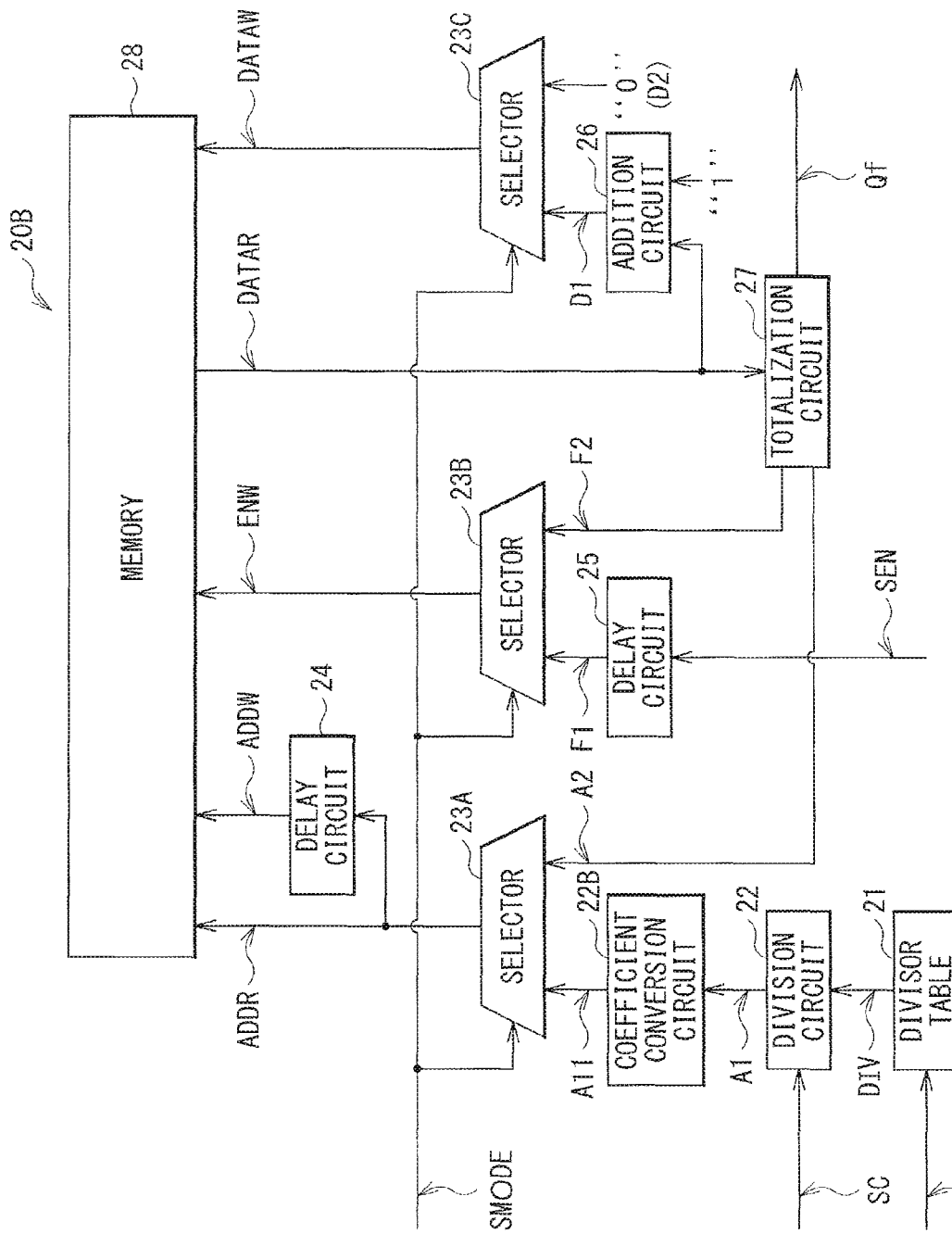
FIG. 23 is a block diagram illustrating a configuration example of a quantization parameter generation section according to a modification of the first embodiment.

FIG. 23 illustrates a configuration example of the quantization parameter generation section 20B according to the present modification. The quantization parameter generation section 20B has a coefficient conversion circuit 22B. The coefficient conversion circuit 22B converts the coefficient data A1 supplied from the division circuit 22 into coefficient data A11, and supplies the coefficient data A11 to the selector 23A. The number of bits of the coefficient data A11 is smaller than the number of bits of the coefficient data A1.

FIG. 24 illustrates conversion characteristics in the coefficient conversion circuit 22B. In this example, the coefficient data A1 is 8-bit data, and the coefficient data A11 is 6-bit data. In other words, the coefficient conversion circuit 22B converts the 8-bit coefficient data A1 into the 6-bit coefficient data A11.

Specifically, the coefficient conversion circuit 22B outputs the coefficient data A1 in a range of 0 to 31 as the coefficient data A11 in the range of 0 to 31. In addition, the coefficient conversion circuit 22B converts the coefficient data A1 in a range of 32 to 63 into the coefficient data A11 in a range of 32 to 47. At this time, the coefficient conversion circuit 22B performs the conversion at a rate of one piece of coefficient data A11 with respect to two pieces of coefficient data A1. Likewise, the coefficient conversion circuit 22B converts the coefficient data A1 in a range of 64 to 95 into the coefficient data A11 in a range of 48 to 55. At this time, the coefficient conversion circuit 22B performs the conversion at a rate of one piece of the coefficient data A11 with respect to four pieces of the coefficient data A1. In addition, the coefficient conversion circuit 22B converts the coefficient data A1 in a range of 96 to 127 into the coefficient data A11 in a range of 56 to 59. At this time, the coefficient conversion circuit 22B performs the conversion at a rate of one piece of the coefficient data A11 with respect to eight pieces of the coefficient data A1. Moreover, the coefficient conversion circuit 22B converts the coefficient data A1 in a range of 128 to 159 into the coefficient data A11 of 60 and 61. At this time, the coefficient conversion circuit 22B performs the conversion at a rate of one piece of the coefficient data A11 with respect to 16 pieces of the coefficient data A1. Further, the coefficient conversion circuit 22B converts 32 pieces of the coefficient data A1 in a range of 160 to 191 into the coefficient data A11 having the value of 62, and converts 65 pieces of the coefficient data A1 in a range of 192 to 256 into the coefficient data A11 having the value of 63. In this way, the coefficient conversion circuit 22B ranks the coefficient data A1, and number of the rank is output as the coefficient data A11.

In the quantization parameter generation section 20B according to the present modification, the coefficient conversion circuit 22B is provided as described above, and therefore it is possible to reduce the memory capacity of the memory 28. In other words, since the quantization parameter generation section 20 according to the above-described first embodiment generates the histogram HG for the coefficient data A1, the memory space according to the number of bits (for example, 8 bits) of the coefficient data A1 is necessary. On the other hand, since the quantization parameter generation section 20B according to the present modification generates the histogram HG for the coefficient data A11, the memory space according to the number of bits (for example, 6 bits) of the coefficient data A11 is only necessary. Accordingly, it is possible to reduce the memory capacity of the memory 28.

Moreover, in the coefficient conversion circuit 22B, larger pieces of the coefficient data A1 are allocated to one piece of coefficient data A11 as the value of the coefficient data A1 is larger. In other words, for example, in a range of 0 to 31 of the coefficient data A1, the coefficient data A1 and the coefficient data A11 may be allocated at a ratio of 1:1, in a range of 32 to 63 of the coefficient data A1, the coefficient data A1 and the coefficient data A11 are allocated at a ratio of 2:1, and in a range of 64 to 95 of the coefficient data A1, the coefficient data A1 and the coefficient data A11 are allocated at a ratio of 4:1. As a result, it is possible to reduce the memory capacity of the memory 28 while maintaining calculation accuracy of the quantization parameter Qf. In other words, in a normal frame image F, many of coefficient data A1 have a low value, and few coefficient data A1 have a high value. Accordingly, the coefficient data A1 in the wider range is allocated to one piece of coefficient data A11 for the coefficient data A1 having the high value, and thus it is possible to reduce the memory capacity of the memory 28 while maintaining the calculation accuracy of the quantization parameter Qf.

(Modification 1-2)

In the above-described first embodiment, the quantization parameter generation section 20 accumulates the coefficient data C with use of the memory 28; however, this is not limitative. Alternatively, for example, the quantization parameter generation section 20 may use a counter. The present modification will be described in detail below.

Figure 25:
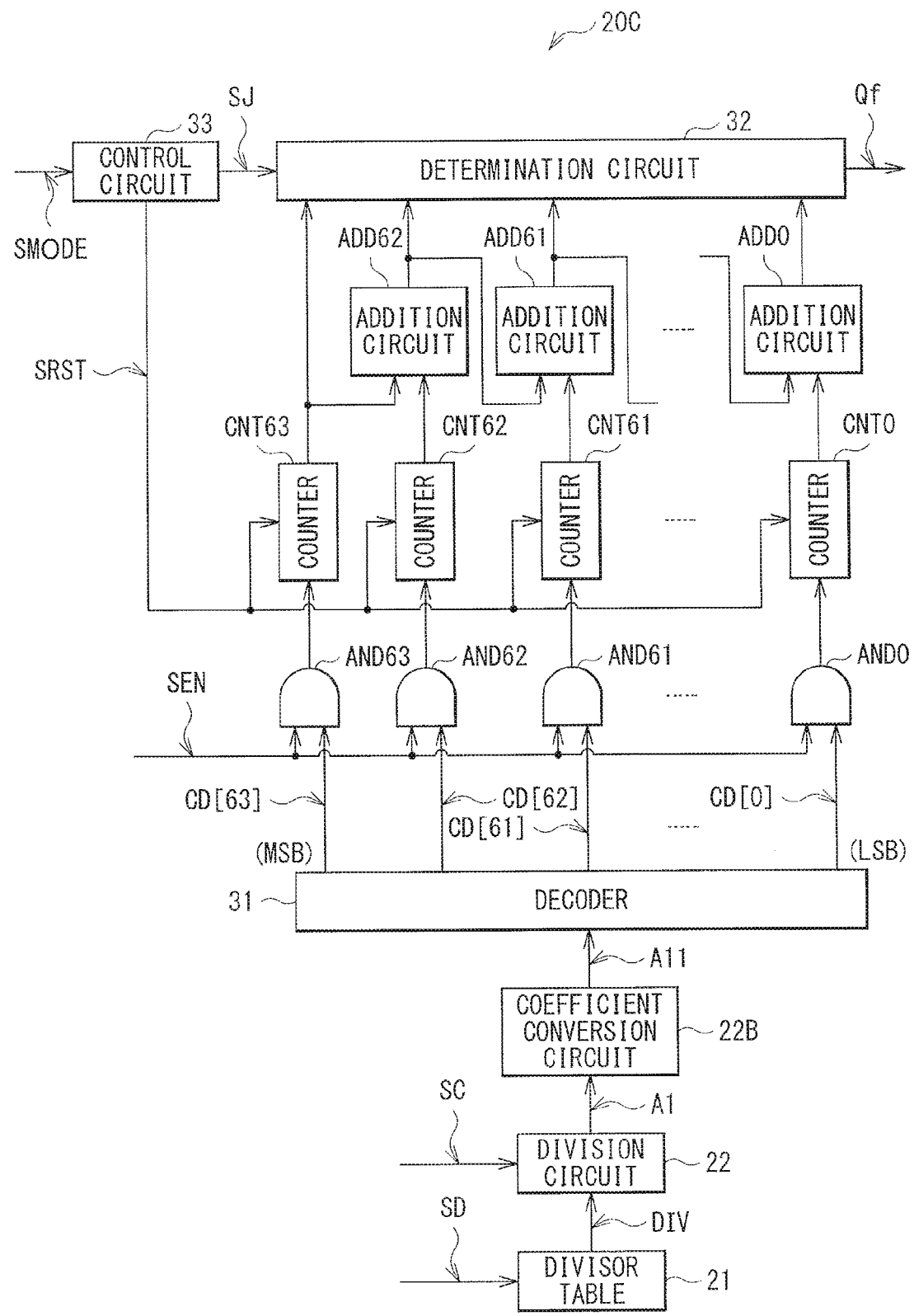
FIG. 25 is a block diagram illustrating a configuration example of a quantization parameter generation section according to another modification of the first embodiment.

FIG. 25 illustrates a configuration example of a quantization parameter generation section 20C according to the present modification. The quantization parameter generation section 20C includes a decoder 31, 64 AND circuits AND0 to AND 63, 64 counters CNT0 to CNT63, 63 addition circuits ADD0 to ADD62, a determination circuit 32, and a control circuit 33.

The decoder 31 generates 64-bit code CD (bits CD[63:0]), based on the coefficient data A11 supplied from the coefficient conversion circuit 22B. In this example, the coefficient data A11 is 6-bit data as described in the modification 1-1, and indicates a value in a range of 0 to 63. The decoder 31 generates the code CD by setting, out of the bits CD[63:0] of the code CD, the bits corresponding to the value indicated by the coefficient data A11 to "1" and setting the other bits to "0". Specifically, for example, the decoder 31 may generate the code CD of "0000 . . . 00001" when the coefficient data A11 is "0", the decoder 31 may generate the code CD of "0000 . . . 000010" when the coefficient data A11 is "1", and the decoder 31 may generate the code CD of "0000 . . . 000100" when the coefficient data A11 is "2".

The AND circuits AND0 to AND63 are circuits each obtaining a logical AND of signals that are input to two input terminals. The AND circuits AND0 to AND63 are provided corresponding to the respective bits CD[63:0] of the code CODE. Specifically, for example, "0"-th bit CD[0] of the code CD may be input to a first input terminal of the AND circuit AND0, and the coefficient enable signal SEN may be input to a second input terminal thereof. Moreover, for example, "1"-st bit CD[1] of the code CD may be input to a first input terminal of the AND circuit AND1, and the coefficient enable signal SEN may be input to a second terminal thereof.

The counters CNT0 to CNT63 are counter circuits each counting the number of input pulses. The counters CNT0 to CNT63 are provided corresponding to the AND circuits AND0 to AND63. Specifically, for example, an input terminal of the counter CNT0 is connected to an output terminal of the AND circuit AND0, and an input terminal of the counter CNT1 is connected to an output terminal of the AND circuit AND1. Moreover, a count value of each of the counters CNT0 to CNT63 is reset by a reset signal SRST (described later) supplied from the control circuit 33.

The addition circuits ADD0 to ADD62 are circuits each obtaining a sum of values input to two input terminals. The addition circuits ADD0 to ADD62 are provided corresponding to the counters CNT0 to CNT62. Specifically, for example, a first input terminal of the addition circuit ADD62 may be connected to an output terminal of the counter CNT63, and a second input terminal thereof may be connected to an output terminal of the counter CNT62. Moreover, for example, a first input terminal of the addition circuit ADD61 may be connected to an output terminal of the addition circuit ADD62, and a second input terminal thereof may be connected to an output terminal of the counter CNT61. In addition, for example, a first input terminal of the addition circuit ADD0 may be connected to an output terminal of the addition circuit ADD1, and a second input terminal thereof may be connected to an output terminal of the counter CNT0.

The determination circuit 32 obtains the quantization parameter Qf, based on the output signals from the addition circuits ADD0 to ADD62 and an output signal from the counter CNT63. Determination operation of the determination circuit 32 is controlled based on a control signal SJ (described later) supplied from the control circuit 33.

The control circuit 33 controls operation of each of the counters CNT0 to CNT63 and the determination circuit 32. The control circuit 33 generates the reset signal SRST and the control signal SJ based on the mode selection signal SMODE. Specifically, the control circuit 33 resets the count value of each of the counters CNT0 to CNT63 through the reset signal SRST immediately before the operation mode is put into the accumulation mode M1. Moreover, after the operation mode is put into the totalization mode M1, the control circuit 33 operates the determination circuit 32 through the control signal SJ, and the determination circuit 32 obtains the quantization parameter Qf.

With this configuration, the quantization parameter generation section 20C generates the histogram HG based on the coefficient data A1, and generates the quantization parameter Qf based on the histogram HG, as with the quantization parameter generation section 20 according to the above-described first embodiment. In other words, first, when the coefficient data A1 is input to the decoder 31, only the bit corresponding to the coefficient data A1, out of the bits CD[63:0] of the code CD, becomes "1". Then, out of the counters CNT0 to CNT63, only the counter relating to the bit counts up the count value. The counters CNT0 to CNT63 retain the respective frequencies of the histogram HG by continuing this operation. Then, the addition circuits ADD0 to ADD62 add the count values (the frequencies) of the respective counters CNT0 to CNT63 in order from the MSB side to obtain the accumulated values ACC. Specifically, for example, an output value of the addition circuit ADD2 indicates the accumulated value ACC in a range where the coefficient data A11 is "62" or more (A11≥62), and an output value of the addition circuit ADD61 indicates the accumulated value ACC in a range where the coefficient data A11 is "61" or more (A11≥61). Then, the determination circuit 32 compares each of the accumulated values with the parameter NNZ to obtain the quantization parameter Qf, as with the totalization circuit 27 according to the above-described first embodiment.

(Modification 1-3)

In the above-described modification 1-2, the addition circuits ADD0 to ADD62 are provided; however, this is not limitative. The addition circuits ADD0 to ADD62 may not be provided. The present modification will be described in detail below.

Figure 26:
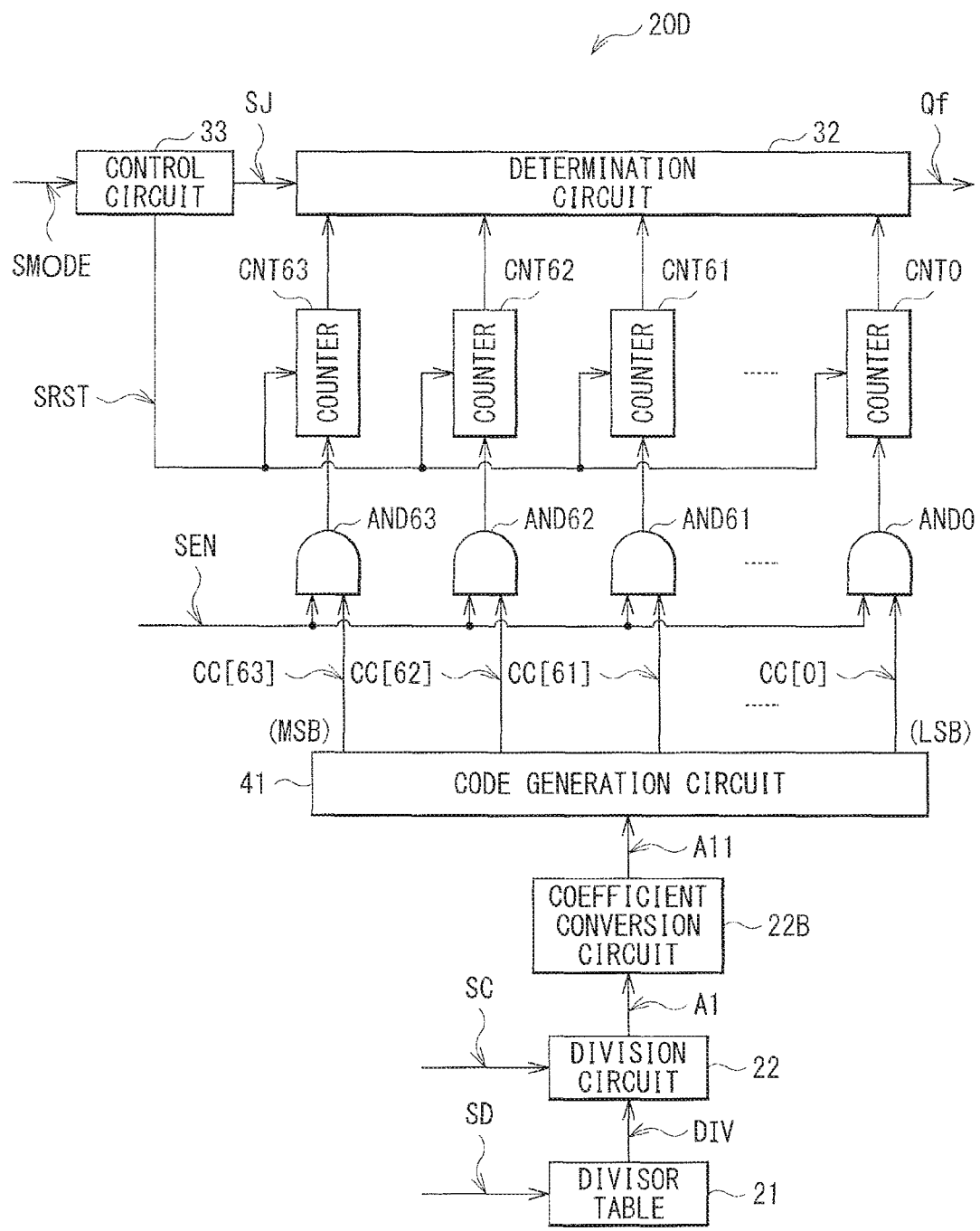
FIG. 26 is a block diagram illustrating a configuration example of a quantization parameter generation section according to another modification of the first embodiment.

FIG. 26 illustrates a configuration example of a quantization parameter generation section 20D according to the present modification. The quantization parameter generation section 20D includes a code generation circuit 41. Specifically, the quantization parameter generation section 20D is configured by providing the code generation circuit 41 in place of the decoder 31 and omitting the addition circuits ADD0 to ADD62 in the quantization parameter generation section 20C according to the modification 1-2 (FIG. 25).

The code generation circuit 41 generates 64-bit code CC (bits CC[63:0]) based on the coefficient data A11 supplied from the coefficient conversion circuit 22B.

FIG. 27 illustrates operation of the code generation circuit 41. For example, the code generation circuit 41 may generate a code CC of "0000 . . . 000001" when the coefficient data A11 is "0", may generate a code CC of "0000 . . . 000011" when the coefficient data A11 is "1", and may generate a code CC of "0000 . . . 000111" when the coefficient data A11 is "2". As described above, the code generation circuit 41 arranges "1" from LSB side (CC[0] side) by the number of a value that is obtained by adding "1" to the value of the coefficient data A11 and setting the other to "0", to generate the code CC.

In the quantization parameter generation section 20D, such a code generation circuit 41 is provided so that the counters CNT0 to CNT63 generates not the histogram HG but the accumulated values ACC in the histogram HG. Specifically, for example, the output value of the counter CNT62 indicates the accumulated value ACC in a range where the coefficient data A11 is "62" or more (A11≥62), and the output value of the counter CNT61 indicates the accumulated value ACC in a range where the coefficient data A11 is "61" or more (A11≥61). Then, the determination circuit 32 compares each of the accumulated values with the parameter NNZ to obtain the quantization parameter Qf. With this configuration, since the accumulated values ACC are allowed to be obtained while accumulating data, it is possible to decrease process time for calculation of the quantization parameter Qf.

(Modification 1-4)

In the above-described first embodiment, the transmitter 1 transmits the data to the receiver 9 with use of the data signals DATA[1:0], the clock signal CLK2, and the flag signal FLAG; however, this is not limitative. Alternatively, for example, the transmitter 1 may transmit the data with use of a pair of differential signals through an embedded clock system.

(Modification 1-5)

Figure 28:
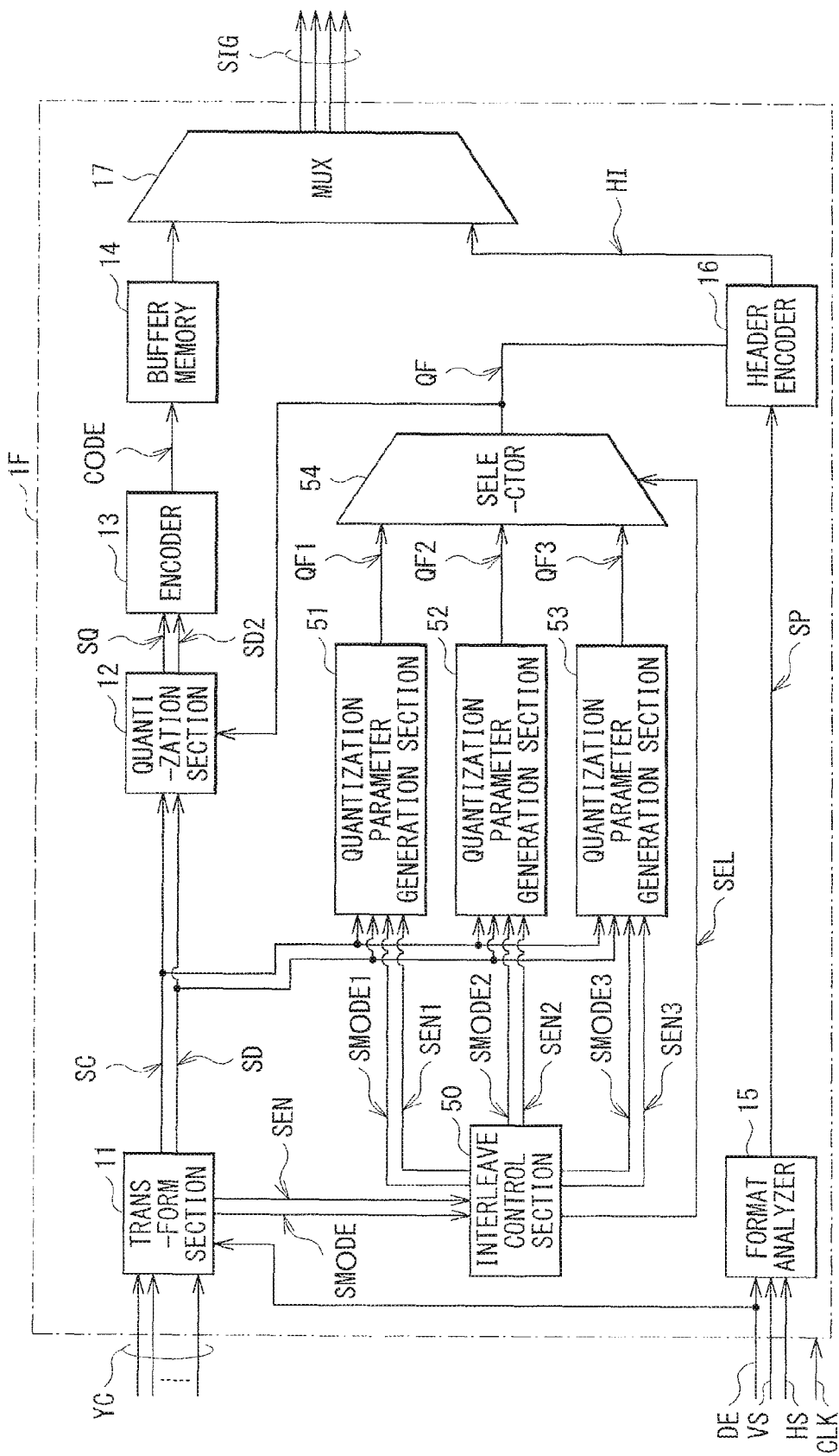
FIG. 28 is a block diagram illustrating a configuration example of a transmitter according to another modification of the first embodiment.

In the above-described first embodiment, in the transmitter 1, one quantization parameter generation section 20 generates the quantization parameter Qf; however, this is not limitative. Alternatively, for example, as a transmitter 1F illustrated in FIG. 28, a plurality of (in this example, three) quantization parameter generation sections 51 to 53 may be provided and switchingly operated for each process object range TR. The transmitter 1F includes an interleave control section 50, three quantization parameter generation sections 51 to 53, and a selector 54. The interleave control section 50 controls the quantization parameter generation sections 51 to 53 through mode selection signals SMODE1 to SMODE3 and the coefficient enable signal SEN so that the three quantization parameter generation sections 51 to 53 are switchingly operated for each process object range TR. Moreover, the interleave control section 50 has a function of controlling the operation of the selector 54 through a control signal SEL in synchronization with the switching operation of the quantization parameter generation sections 51 to 53. The quantization parameter generation sections 51 to 53 are each similar to the quantization parameter generation section 20 according to the above-described first embodiment, and generate quantization parameters Qf1 to Qf3, respectively, based on the coefficient data C in process object ranges TR different from one another. The selector 54 selects one of the quantization parameters Qf1 to Qf3 based on the control signal SEL, and outputs the selected one as the quantization parameter Qf. With this configuration, for example, even when the quantization parameter generation sections 51 to 53 take a time to obtain the quantization parameters Qf1 to Qf3, respectively, operation may be smoothly performed.
(Modification 1-6)

In the above-described first embodiment, the transform section 11 performs the discrete wavelet transform; however, this is not limitative. Alternatively, for example, the transform section 11 may perform other transform such as discrete cosine transform. Also in the case where the discrete cosine transform is performed, the coordinate importance exists in the coefficient data C in addition to the coefficient importance.

Figure 29:
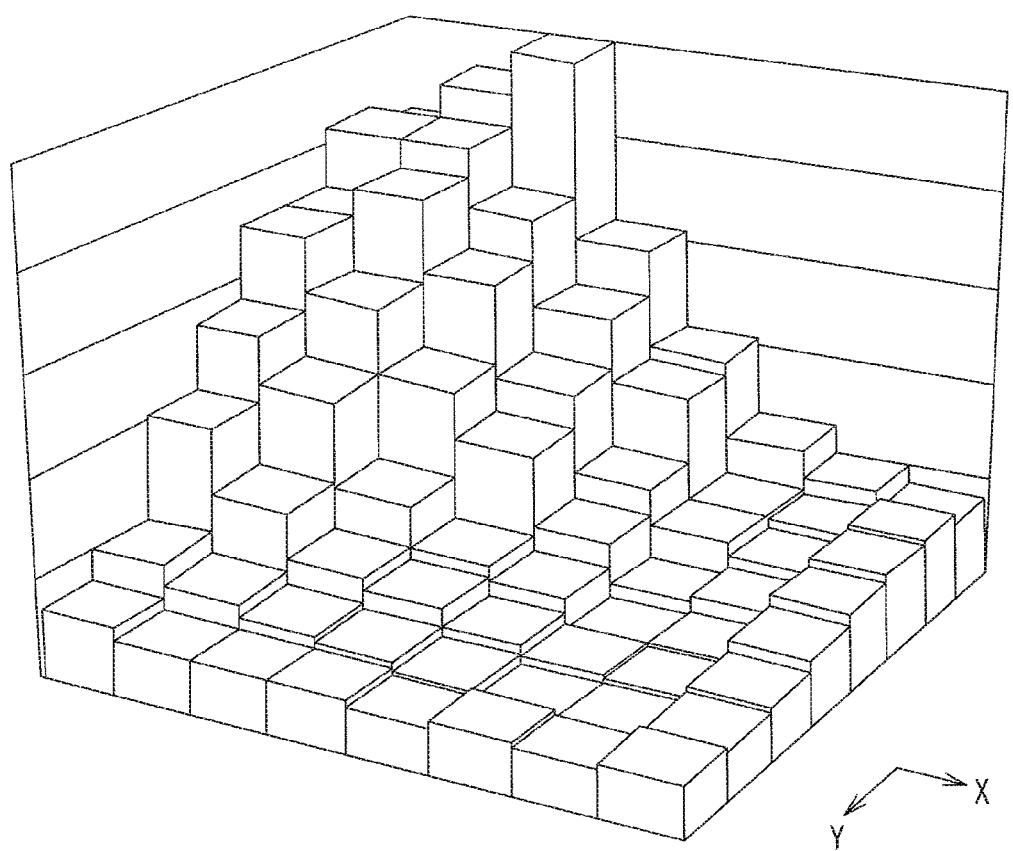
FIG. 29 is an explanatory diagram for explaining coordinate importance of coefficient data according to another modification of the first embodiment.

FIG. 29 illustrates coefficient coordinate dependency of importance of the coefficient data C in the case where the discrete cosine transform is performed. Also in this case, as with the case of the discrete wavelet transform (FIG. 3), the importance of the coefficient data C is higher as the coordinate x and the coordinate y are smaller.

Accordingly, also in the present modification, the quantization section 12 and the encoder 13 compress the image in consideration of the coordinate importance and the like. As a result, it is possible to reduce the code size after coding by the encoder 13 while suppressing degradation in image quality.
(Modification 1-7)

In the above-described first embodiment, for example, the process object range TR may be a range of a predetermined number of lines; however, this is not limitativeorresponding to on. Alternatively, for example, the process object range TR may be a range c e or a plurality of frame images F.

<2. Second Embodiment>

Next, a transmission system 200 according to a second embodiment is described. In the second embodiment, an order of coding the quantized data Q in the encoder is devised. Note that like numerals are used to designate substantially like components of the transmission system 100 according to the above-described first embodiment, and the description thereof is appropriately omitted.

Figure 30:
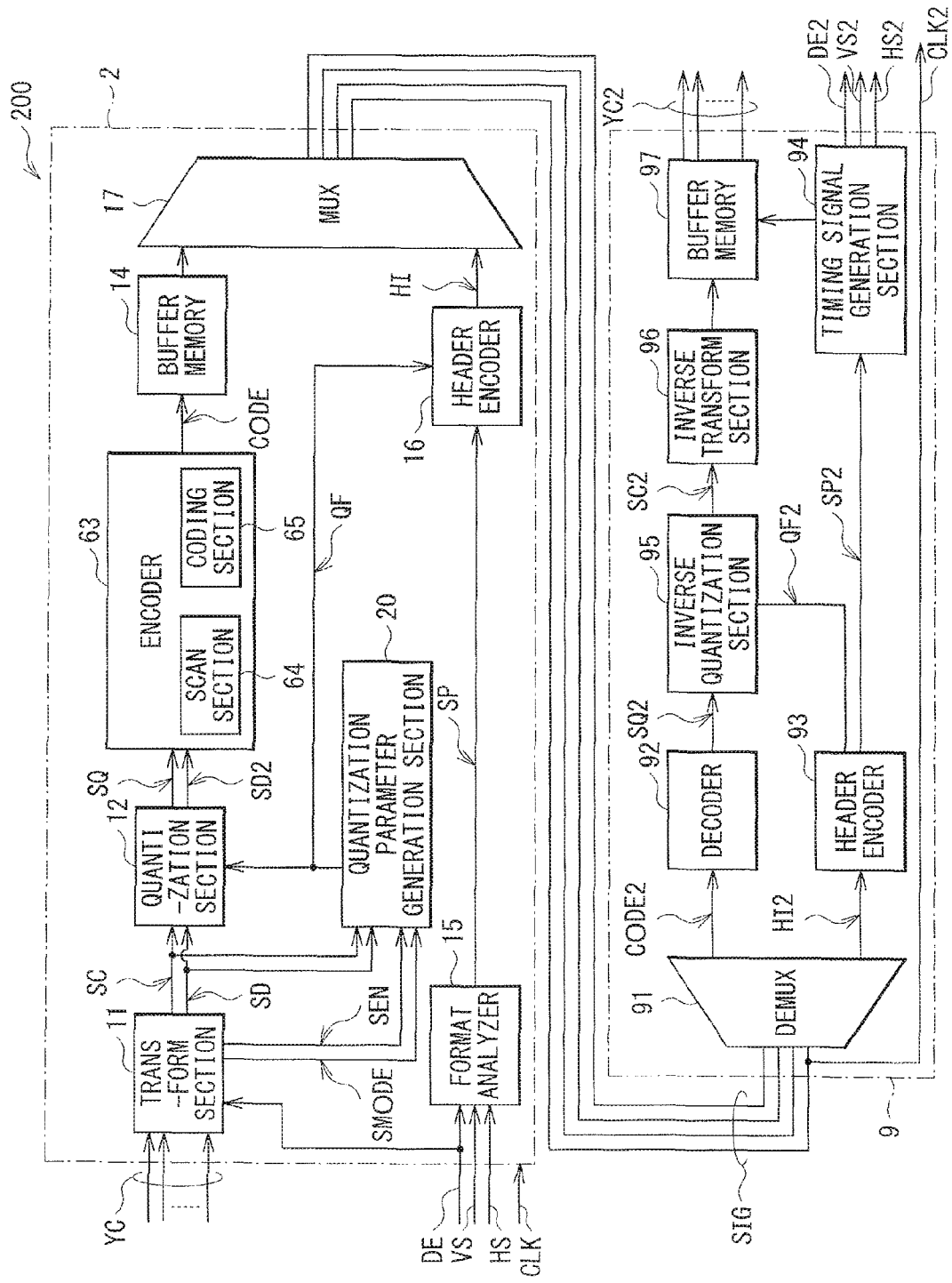
FIG. 30 is a block diagram illustrating a configuration example of a transmission system according to a second embodiment.

FIG. 30 illustrates a configuration example of the transmission system 200. The transmission system 200 includes a transmitter 2 having an encoder 63. The encoder 63 encodes the quantized data Q in a random order. The encoder 63 includes a scan section 64 and a coding section 65. The scan section 64 gives the coding section 65 an order of coding the quantized data Q. The coding section 65 encodes the quantized data Q in order instructed by the scan section 64.

The encoder 63 encodes the quantized data Q in order from the quantized data Q relating to the coefficient data C high in coordinate importance (FIG. 3), as with the encoder 13 according to the above-described first embodiment. Specifically, as illustrated in FIGS. 2C and 3, the encoder 13 encodes the quantized data Q corresponding to the "3LL" component, and then encodes the respective pieces of the quantized data Q corresponding to the "3HL" component and the "3LH" component. Then, the encoder 13 encodes the respective pieces of the quantized data Q corresponding to the "3HH" component, the "2HL" component, and the "2LH" component, then encodes the respective pieces of the quantized data Q corresponding to the "2HH" component, the "1HL" component, and the "1LH" component, and finally encodes the quantized data Q corresponding to the "1HH" component. At this time, the encoder 63 encodes the quantized data Q in a random order in each component (sub-band). Specifically, the scan section 64 of the encoder 63 generates a pseudo random number sequence by using, for example, a linear congruent method, and determines coding order based on the pseudo random number sequence.

Figure 31:
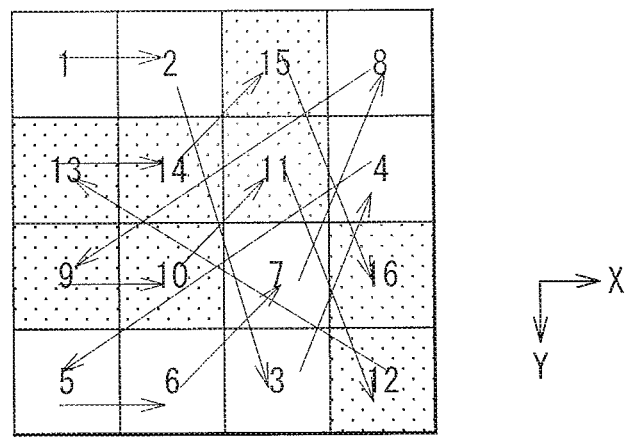
FIG. 31 is an explanatory diagram illustrating an operation example of an encoder illustrated in FIG. 30.

FIG. 31 illustrates an example of coding order in the encoder 63. In this example, for convenience of description, illustration is made by 4×4 coefficient coordinates. In FIG. 31, numbers indicate order of coding the quantized data Q. In this way, the quantized data Q is encoded in random order in each component.

The scan section 64 of the encoder 63 generates the pseudo random number sequence by using the linear congruent method, and determines the cording order based on the pseudo random number sequence. Therefore, the scan section 64 is allowed to scan all of the coefficient coordinates once in order with low regularity.

The encoder 63 performs the so-called random scan in such a manner to encode the quantized data Q. As a result, as will be described in comparison with a comparative example 2 below, even if all codes CODE relating to a certain component (sub-band) are not allowed to be transmitted to the receiver 9, degradation in image quality is allowed to be suppressed.

Figure 32:
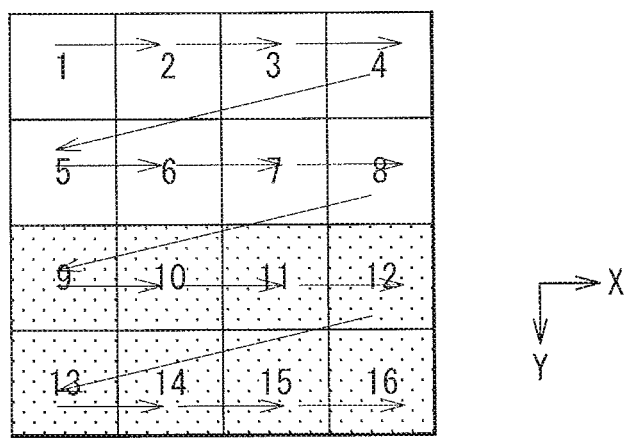
FIG. 32 is an explanatory diagram illustrating an operation example of an encoder according to a comparative example of the second embodiment.

FIG. 32 illustrates an example of cording order by an encoder 63R according to the comparative example 2. In this example, the encoder 63R performs so-called raster scan to encode the quantized data Q in order from upper left in the coefficient coordinates. In this case, for example, when all of 16 codes CODE relating to the component (sub-band) are not allowed to be transmitted to the receiver 9, the image quality may be degraded. In other words, when only half of 16 codes CODE are allowed to be transmitted to the receiver 9, the codes CODE at hatched parts in FIG. 32 are lost. Therefore, for example, upper half of the reproduced image is high in image quality, whereas lower half thereof is low in image quality. In such a case, degradation of image quality collectively occurs in the lower half of the image and boundary between a high image-quality part and a low image-quality part is noticeable, which causes a viewer to feel image quality low.

On the other hand, the encoder 63 according to the second embodiment performs the random scan to encode the quantized data Q. Therefore, even if the codes CODE at the hatched parts are lost as illustrated in FIG. 31, the parts where the image quality is lowered are dispersed in the image, and thus the possibility that the viewer feels image quality low is reduced.

As described above, in the second embodiment, since the quantized data is coded in a random order in each component (sub-band), even if all of the codes are not allowed to be transmitted, it is possible to suppress degradation in image quality.
(Modification 2-1)

In the above-described second embodiment, the scan section 64 generates the pseudo random number sequence by using the linear congruent method, and determines the coding order based on the pseudo random number sequence. However, this is not limitative, and alternatively, for example, the coding order may be determined based on a random number table.

3. Application Examples

Next, application examples of the transmission systems described in the embodiments and the modifications described above will be described.

Figure 33:
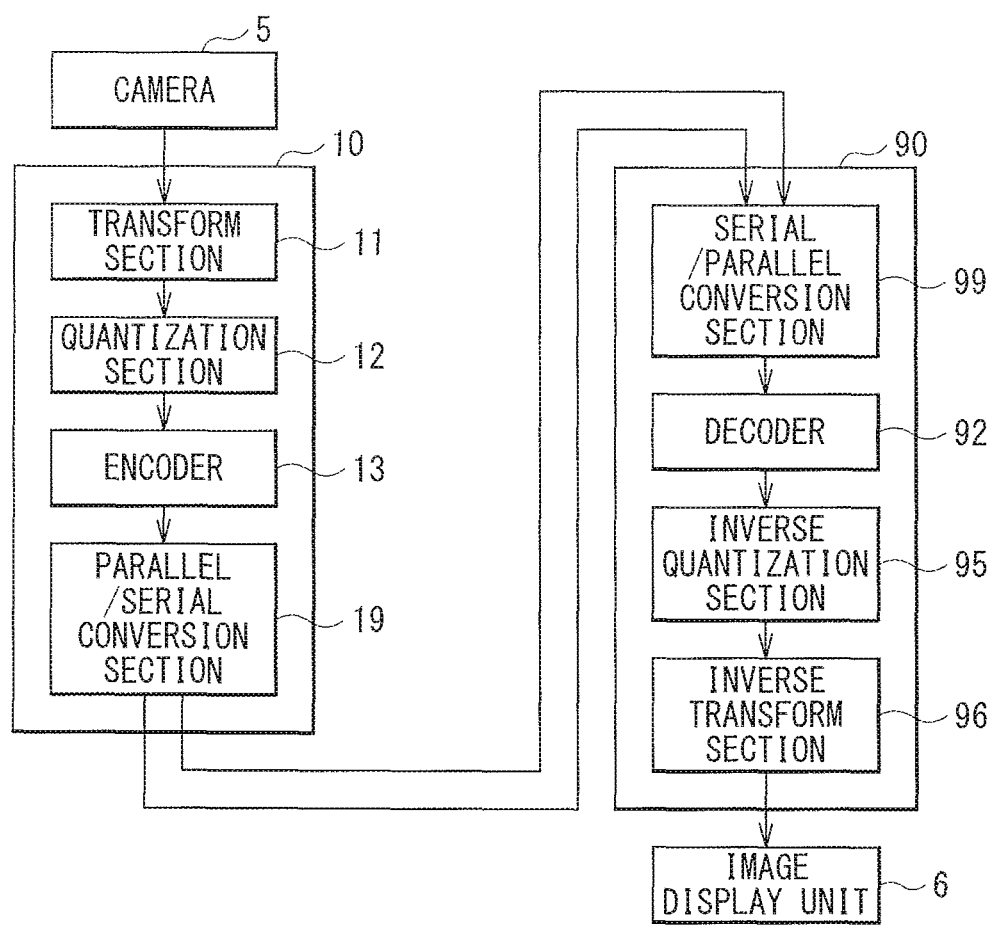
FIG. 33 is a block diagram illustrating an application example of any of the embodiments.

FIG. 33 illustrates a first application example of the transmission system according to any of the above-described embodiments and the like. In this example, the transform section 11, the quantization section 12, and the encoder 13 of the transmitter 10 perform the image compression, based on the image signal of the moving picture supplied from a camera 5, and a parallel/serial conversion section 19 transmits compressed codes with use of a pair of differential signals by the embedded clock system. Then, a serial/parallel conversion section 99 of a receiver 90 receives the differential signals, the decoder 92, the inverse quantization section 95, and the inverse transform section 96 of the receiver 90 reproduces the image signal, and an image display unit 6 displays the moving picture based on the reproduced image signal.

Figure 34:
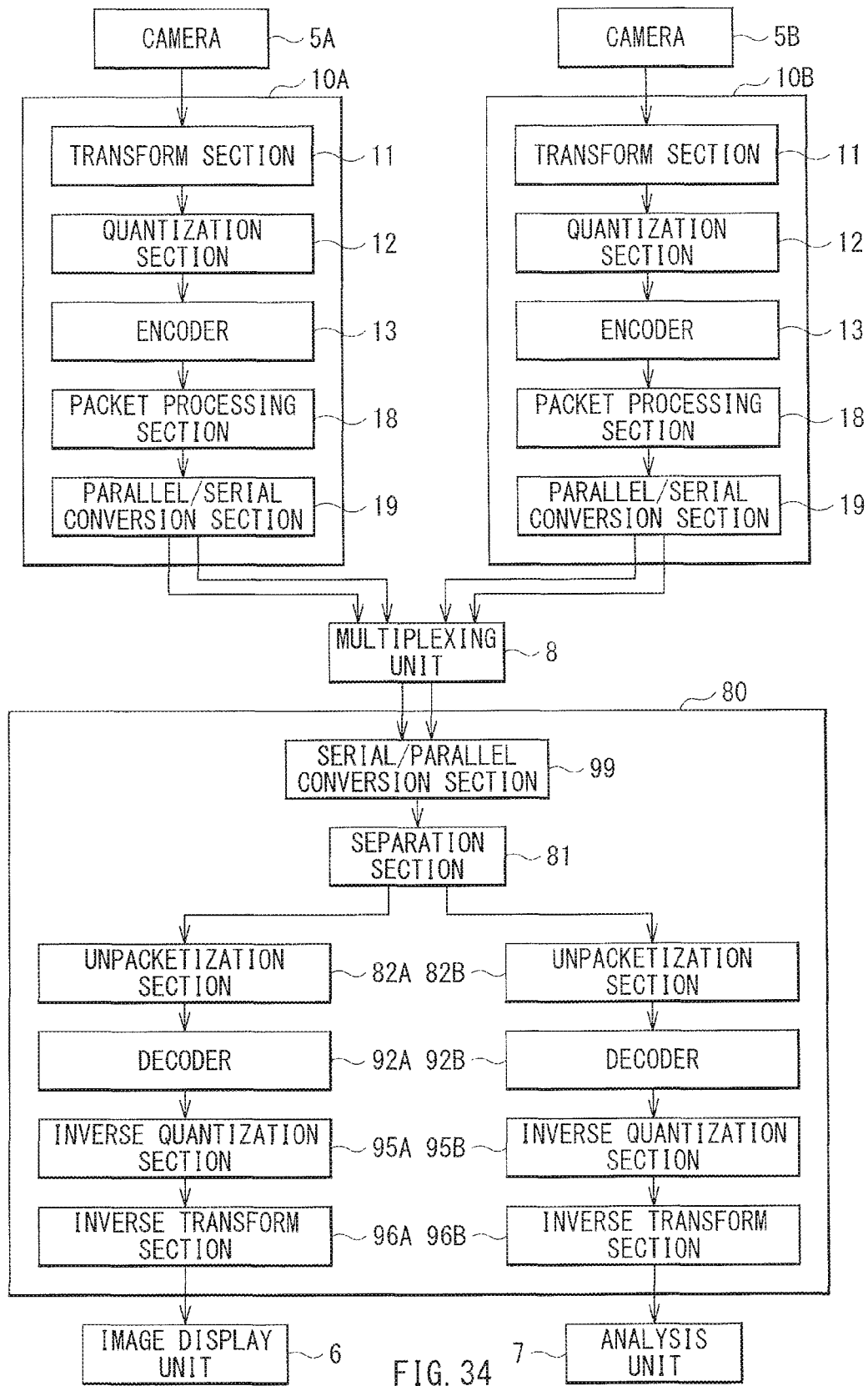
FIG. 34 is a block diagram illustrating another application example of any of the embodiments.

FIG. 34 illustrates a second application example of the transmission system according to any of the above-described embodiments and the like. In this example, the transform section 11, the quantization section 12, and the encoder 13 of a transmitter 10A perform the image compression, based on the image signal of the moving picture supplied from a camera 5A, and a packet processing section 18 packetizes the compressed codes. At the time of the packetization processing, the packet processing section 18 of the transmitter 10A provides a camera ID (identification number) of the camera 5A to the packets. Then, the parallel/serial conversion section 19 transmits a series of packets with use of a pair of differential signals by the embedded clock system. Likewise, the transform section 11, the quantization section 12, and the encoder 13 of a transmitter 10B perform the image compression based on the image signal of the moving picture supplied from a camera 5B, and the packet processing section 18 packetizes the compressed codes. At the time of the packetization processing, the packet processing section 18 of the transmitter 10B provides a camera ID of the camera 5B to the packets. Then, the parallel/serial conversion section 19 transmits a series of packets with use of a pair of differential signals by the embedded clock system. A multiplexing unit 8 multiplexes two pairs of differential signals that are supplied from the transmitters 10A and 10B and transmits the multiplexed signals as a pair of differential signal.

Then, the serial/parallel conversion section 99 of the receiver 80 receives the differential signals, and a separation section 81 separates packets based on the camera ID provided to the packets to supply packets relating to the camera 5A to an unpacketization processing section 82A and to supply packets relating to the camera 5B to an unpacketization processing section 82B. The unpacketization processing section 82A unpacktizes the supplied packets, a decoder 92A, an inverse quantization section 95A, and an inverse transform section 96A reproduce the image signals, and the image display unit 6 displays the moving picture based on the reproduced image signals. Moreover, the unpacketization processing section 82B unpacketizes the supplied packets, a decoder 92B, an inverse quantization section 95B, and an inverse transform section 96B reproduce the image signals, and an analysis unit 7 analyzes the moving picture based on the reproduced image signals.

Hereinbefore, although the technology has been described with referring to the embodiments, the modifications, and the application examples, the technology is not limited thereto, and various modifications may be made.

For example, in the above-described embodiments and the like, the transform section 11 performs the discrete wavelet transform or the discrete cosine transform; however, this is not limited thereto, and other various transform methods may be employed. Moreover, although the encoder 13 encodes the quantized data Q by Huffman coding method, this is not limited thereto, and other various coding methods may be employed.

Moreover, for example, in the above-described embodiments and the like, the quantization parameter generation section 20 achieves the function of generating the quantization parameter Qf based on the coefficient data C and the like, by hardware. However, this is not limited thereto, and alternatively, for example, the function may be achieved by software with use of a microcontroller or the like.

Further, for example, in the above-described first embodiment, the histogram HG is generated with use of the memory 28. However, this is not limitative, and alternatively, for example, not the histogram HG itself but the accumulated values ACC from higher side in the histogram HG may be generated.

Note that the technology may be configured as follows.

(1) An image compression circuit including:
a transform section configured to transform a plurality of pieces of pixel data into a plurality of pieces of coefficient data; and
a quantization section configured to obtain a quantization parameter based on a predetermined number of pieces of the coefficient data, and to quantize the predetermined number of pieces of the coefficient data with use of the quantization parameter.

(2) The image compression circuit according to (1), wherein the quantization section obtains a histogram based on the predetermined number of pieces of the coefficient data, and obtains the quantization parameter based on the histogram.

(3) The image compression circuit according to (2), wherein the quantization section obtains a maximum range of the coefficient data where an accumulated value does not exceed a predetermined threshold, and defines a minimum value of the coefficient data in the maximum range as the quantization parameter, the accumulated value being obtained by sequentially adding frequencies in descending order of the coefficient data in the histogram.

(4) The image compression circuit according to (2) or (3), wherein
the transform section also generates coefficient coordinates corresponding to the respective coefficient data, and
the quantization section corrects the respective coefficient data, based on the coefficient coordinates corresponding to the respective coefficient data, to obtain the histogram, based on the corrected coefficient data.

(5) The image compression circuit according to any one of (2) to (4), wherein
the histogram indicates frequencies for respective predetermined ranges of the coefficient data, and
the predetermined ranges are different from one another depending on a value of the coefficient data.

(6) The image compression circuit according to any one of (2) to (4), wherein
the histogram indicates frequencies for respective predetermined ranges of the coefficient data, and
the predetermined ranges are the same as one another irrespective of a value of the coefficient data.

(7) The image compression circuit according to any one of (2) to (6), wherein the quantization section includes a memory, and increments a value stored at an address corresponding to the value of the respective coefficient data, to generate the histogram.

(8) The image compression circuit according to any one of (2) to (6), wherein the quantization section includes a plurality of counters corresponded to values of the coefficient data, and counts up the counter corresponding to the value of the supplied coefficient data, to generate the histogram.

(9) The image compression circuit according to (1), wherein the quantization section obtains an accumulated histogram from a larger coefficient data side, based on the predetermined number of pieces of the coefficient data, and obtains the quantization parameter, based on the accumulated histogram.

(10) The image compression circuit according to (9), wherein the quantization section defines, as the quantization parameter, a minimum value of the coefficient data at which a frequency in the accumulated histogram does not exceed a predetermined threshold.

(11) The image compression circuit according to (9) or (10), wherein the quantization section includes a plurality of counters corresponded to values of the coefficient data, and counts up the number of counters corresponding to the values of the coefficient data, out of the plurality of counters, to generate the accumulated histogram.

(12) The image compression circuit according to any one of (1) to (11), wherein
the quantization section includes a plurality of parameter generation sections each configured to obtain the quantization parameter, and
the parameter generation sections switchingly operate to obtain the quantization parameter for every predetermined number of pieces of coefficient data.

(13) The image compression circuit according to any one of (1) to (12), wherein the transform section performs discrete wavelet transform.

(14) The image compression circuit according to (13), further including a coding section configured to encode the plurality of pieces of quantized coefficient data, wherein
the transform section also generates coefficient coordinates corresponding to the respective coefficient data, and
the coding section encodes coefficient data at the respective coefficient coordinates within a predetermined region, out of the plurality of pieces of quantized coefficient data, in random order.

(15) The image compression circuit according to (14), wherein the coding section generates a pseudo random number sequence by using a linear congruent method, and encodes the coefficient data in order based on the pseudo random number sequence.

(16) The image compression circuit according to any one of (1) to (12), wherein the transform section performs discrete cosine transform.

(17) An image compression method including:
transforming a plurality of pieces of pixel data into a plurality of pieces of coefficient data; and
obtaining a quantization parameter based on a predetermined number of pieces of the coefficient data, and quantizing the predetermined number of pieces of the coefficient data with use of the quantization parameter.

(18) A transmission system provided with a transmitter and a receiver, the transmitter including:
a transform section configured to transform a plurality of pieces of pixel data into a plurality of pieces of coefficient data; and
a quantization section configured to obtain a quantization parameter based on a predetermined number of pieces of the coefficient data, and to quantize the predetermined number of pieces of the coefficient data with use of the quantization parameter.

It should be understood by those skilled in the art that various modifications, combinations, sub-combinations, and alterations may occur depending on design requirements and other factors insofar as they are within the scope of the appended claims or the equivalents thereof.

What is claimed is:
1. An image compression circuit comprising:
a transform circuitry configured to transform a plurality of pieces of pixel data into a plurality of pieces of coefficient data; and
a quantization circuitry configured to
obtain a histogram based on a predetermined number of the plurality of pieces of coefficient data,
obtain a quantization parameter based on the histogram and a predetermined threshold by
obtaining a maximum range of the plurality of pieces of coefficient data where an accumulated value does not exceed the predetermined threshold, and
defining a minimum value of the plurality of pieces of coefficient data in the maximum range as the quantization parameter, the accumulated value being obtained by sequentially adding frequencies in descending order of the plurality of pieces of coefficient data in the histogram, and
quantize the predetermined number of the plurality of pieces of coefficient data using the quantization parameter.

2. The image compression circuit according to claim 1, wherein
the histogram indicates frequencies for respective predetermined ranges of the plurality of pieces of coefficient data, and
the predetermined ranges are different from one another depending on a value of the plurality of pieces of coefficient data.

3. The image compression circuit according to claim 1, wherein
the histogram indicates frequencies for respective predetermined ranges of the plurality of pieces of coefficient data, and
the predetermined ranges are the same as one another irrespective of a value of the plurality of pieces of coefficient data.

4. The image compression circuit according to claim 1, wherein the quantization circuitry includes a memory, and wherein the quantization circuitry is further configured to generate the histogram by incrementing a value stored at an address corresponding to a value of respective coefficient data of the plurality of pieces of coefficient data.

5. The image compression circuit according to claim 1, wherein the quantization circuitry includes a plurality of counters that correspond to values of the plurality of pieces of coefficient data, and wherein, to obtain the histogram, the quantization circuitry is further configured to control respective counters of the plurality of counters to count up based on the plurality of pieces of coefficient data.

6. The image compression circuit according to claim 1, wherein, to obtain the histogram based on the predetermined number of the plurality of pieces of coefficient data, the quantization circuitry is further configured to:
obtain an accumulated histogram including accumulated values based on the predetermined number of the plurality of pieces of coefficient data.

7. The image compression circuit according to claim 6, wherein the quantization circuitry includes a plurality of counters that correspond to values of the plurality of pieces of coefficient data, and wherein the quantization circuitry is further configured to count up respective counters of the plurality of counters that correspond to the values of the plurality of pieces of coefficient data to generate the accumulated histogram.

8. The image compression circuit according to claim 1, wherein the quantization circuitry includes a plurality of parameter generation circuitries, each of the plurality of parameter generation circuitries is configured to obtain the quantization parameter, and wherein the plurality of parameter generation circuitries is configured to switchingly operate to obtain the quantization parameter for each of the predetermined number of the plurality of pieces of coefficient data.

9. The image compression circuit according to claim 1, wherein the transform circuitry is configured to perform a discrete wavelet transform.

10. The image compression circuit according to claim 9, further comprising a coding circuitry configured to encode the predetermined number of the plurality of pieces of coefficient data that has been quantized,
wherein the transform circuitry is further configured to generate coefficient coordinates corresponding to respective coefficient data of the plurality of pieces of coefficient data that has been quantized, and
wherein the coding circuitry is further configured to encode the respective coefficient data at the coefficient coordinates within a predetermined region in random order.

11. The image compression circuit according to claim 1, wherein the transform circuitry is configured to perform a discrete cosine transform.

12. The image compression circuit according to claim 1, wherein the predetermined threshold is a preset parameter that is determined from a transmission capacity of a transmission path for transmission of a transmission signal.

13. An image compression circuit comprising:
a transform circuitry configured to
transform a plurality of pieces of pixel data into a plurality of pieces of coefficient data, and
generate coefficient coordinates corresponding to respective coefficient data of the plurality of pieces of coefficient data; and
a quantization circuitry configured to
correct the respective coefficient data based on the coefficient coordinates corresponding to the respective coefficient data,
obtain a histogram based on a predetermined number of the plurality of pieces of coefficient data including the respective coefficient data that is corrected,
obtain a quantization parameter based on the histogram and a predetermined threshold, and
quantize the predetermined number of the plurality of pieces of coefficient data using the quantization parameter.

14. An image compression circuit comprising:
a transform circuitry configured to transform a plurality of pieces of pixel data into a plurality of pieces of coefficient data; and
a quantization circuitry configured to
obtain a histogram based on a predetermined number of the plurality of pieces of coefficient data by obtaining an accumulated histogram including accumulated values based on the predetermined number of the plurality of pieces of coefficient data,
obtain a quantization parameter based on the histogram and a predetermined threshold by defining a minimum value of the plurality of pieces of coefficient data at which a frequency in the accumulated histogram does not exceed the predetermined threshold, and
quantize the predetermined number of the plurality of pieces of coefficient data using the quantization parameter.

15. An image compression circuit comprising:
a transform circuitry configured to
transform a plurality of pieces of pixel data into a plurality of pieces of coefficient data, and
perform a discrete wavelet transform; and
a quantization circuitry configured to
obtain a histogram based on a predetermined number of the plurality of pieces of coefficient data,
obtain a quantization parameter based on the histogram and a predetermined threshold, and
quantize the predetermined number of the plurality of pieces of coefficient data using the quantization parameter; and
a coding circuitry configured to
encode the predetermined number of the plurality of pieces of coefficient data that has been quantized,
generate a pseudo random number sequence by using a linear congruent method, and
encode the plurality of pieces of coefficient data that has been quantized in order based on the pseudo random number sequence,
wherein the transform circuitry is further configured to generate coefficient coordinates corresponding to respective coefficient data of the plurality of pieces of coefficient data that has been quantized, and
wherein the coding circuitry is further configured to encode the respective coefficient data at the coefficient coordinates within a predetermined region in random order.

16. An image compression method comprising:
transforming a plurality of pieces of pixel data into a plurality of pieces of coefficient data;
obtaining a histogram based on a predetermined number of the plurality of pieces of coefficient data;
obtaining a quantization parameter based on the histogram and a predetermined threshold by:
obtaining a maximum range of the plurality of pieces of coefficient data where an accumulated value does not exceed the predetermined threshold, and
defining a minimum value of the plurality of pieces of coefficient data in the maximum range as the quantization parameter, the accumulated value being obtained by sequentially adding frequencies in descending order of the plurality of pieces of coefficient data in the histogram; and
quantizing the predetermined number of the plurality of pieces of coefficient data using the quantization parameter.

17. The image compression method according to claim 16, wherein the predetermined threshold is a preset parameter that is determined from a transmission capacity of a transmission path for transmission of a transmission signal.

18. A transmission system comprising:
a receiver; and
a transmitter including
an image compression circuit having
a transform circuitry configured to transform a plurality of pieces of pixel data into a plurality of pieces of coefficient data; and a quantization circuitry configured to
obtain a histogram based on a predetermined number of the plurality of pieces of coefficient data,
obtain a quantization parameter based on the histogram and a predetermined threshold by obtaining a maximum range of the plurality of pieces of coefficient data where an accumulated value does not exceed the predetermined threshold, and
defining a minimum value of the plurality of pieces of coefficient data in the maximum range as the quantization parameter, the accumulated value being obtained by sequentially adding frequencies in descending order of the plurality of pieces of coefficient data in the histogram, and
quantize the predetermined number of the plurality of pieces of coefficient data using the quantization parameter.

19. The transmission system according to claim 18, wherein the predetermined threshold is a preset parameter that is determined from a transmission capacity of a transmission path for transmission of a transmission signal.

\* \* \* \* \*